(12) United States Patent
Lee

(10) Patent No.: US 8,982,095 B2
(45) Date of Patent: Mar. 17, 2015

(54) CAPACITIVE TOUCH DETECTING DEVICE AND METHOD AND CAPACITIVE TOUCH SCREEN PANEL USING LEVEL SHIFT, AND DISPLAY DEVICE USING THE CAPACITIVE TOUCH SCREEN PANEL

(76) Inventor: Sung Ho Lee, Hwaseong-si (KR)

( * ) Notice: Subject to any disclaimer, the term of this patent is extended or adjusted under 35 U.S.C. 154(b) by 118 days.

(21) Appl. No.: 13/876,350

(22) PCT Filed: Sep. 28, 2011

(86) PCT No.: PCT/KR2011/007138
§ 371 (c)(1),
(2), (4) Date: Mar. 27, 2013

(87) PCT Pub. No.: WO2012/044059
PCT Pub. Date: Apr. 5, 2012

(65) Prior Publication Data
US 2013/0181946 A1   Jul. 18, 2013

(30) Foreign Application Priority Data
Sep. 29, 2010  (KR) .................. 10-2010-0094441

(51) Int. Cl.
*G09G 5/00* (2006.01)
*G06F 3/044* (2006.01)
*G06F 3/041* (2006.01)
*G02F 1/1333* (2006.01)

(52) U.S. Cl.
CPC .............. *G06F 3/044* (2013.01); *G06F 3/0412* (2013.01); *G06F 3/0416* (2013.01); *G02F 1/13338* (2013.01)
USPC ........................................................ 345/174

(58) Field of Classification Search
CPC ..... G06F 3/041; G06F 3/0412; G06F 3/0416; G06F 3/044; G02F 1/13338
USPC .................................................. 345/173, 174
See application file for complete search history.

(56) References Cited

U.S. PATENT DOCUMENTS

| 7,808,255 B2 * | 10/2010 | Hristov et al. ................ 324/686 |
| 2007/0062739 A1 * | 3/2007 | Philipp et al. ............. 178/18.06 |
| 2008/0245582 A1 * | 10/2008 | Bytheway .................. 178/18.06 |
| 2008/0246496 A1 * | 10/2008 | Hristov et al. ................ 324/686 |
| 2009/0009485 A1 * | 1/2009 | Bytheway ..................... 345/174 |
| 2010/0328255 A1 * | 12/2010 | Ishizaki et al. ................ 345/174 |

(Continued)

FOREIGN PATENT DOCUMENTS

| KR | 10-2007-0064769 | 6/2007 |
| KR | 10-2009-0067376 | 6/2009 |

(Continued)

OTHER PUBLICATIONS

International Search Report for International Application No. PCT/KR2011/007138, dated Mar. 23, 2012.

*Primary Examiner* — Tom Sheng
(74) *Attorney, Agent, or Firm* — Kile Park Reed & Houtteman PLLC

(57) ABSTRACT

Provided are a capacitive touch detecting device, a capacitive touch detecting method, and a touch screen panel, using a level shift, and a display device having a built-in touch screen panel, which minimizes an influence due to noise or a parasitic capacitance, and detects a touch input by positively using a signal induced by a common electrode of a liquid crystal display (LCD).

20 Claims, 12 Drawing Sheets

(56) References Cited

U.S. PATENT DOCUMENTS

2011/0199333 A1* 8/2011 Philipp et al. ............... 345/174
2013/0162595 A1* 6/2013 Lee .............................. 345/174

FOREIGN PATENT DOCUMENTS

KR 10-2010-0015225 2/2010
KR 10-2010-0048236 5/2010

* cited by examiner

FIG. 1 [Prior Art]
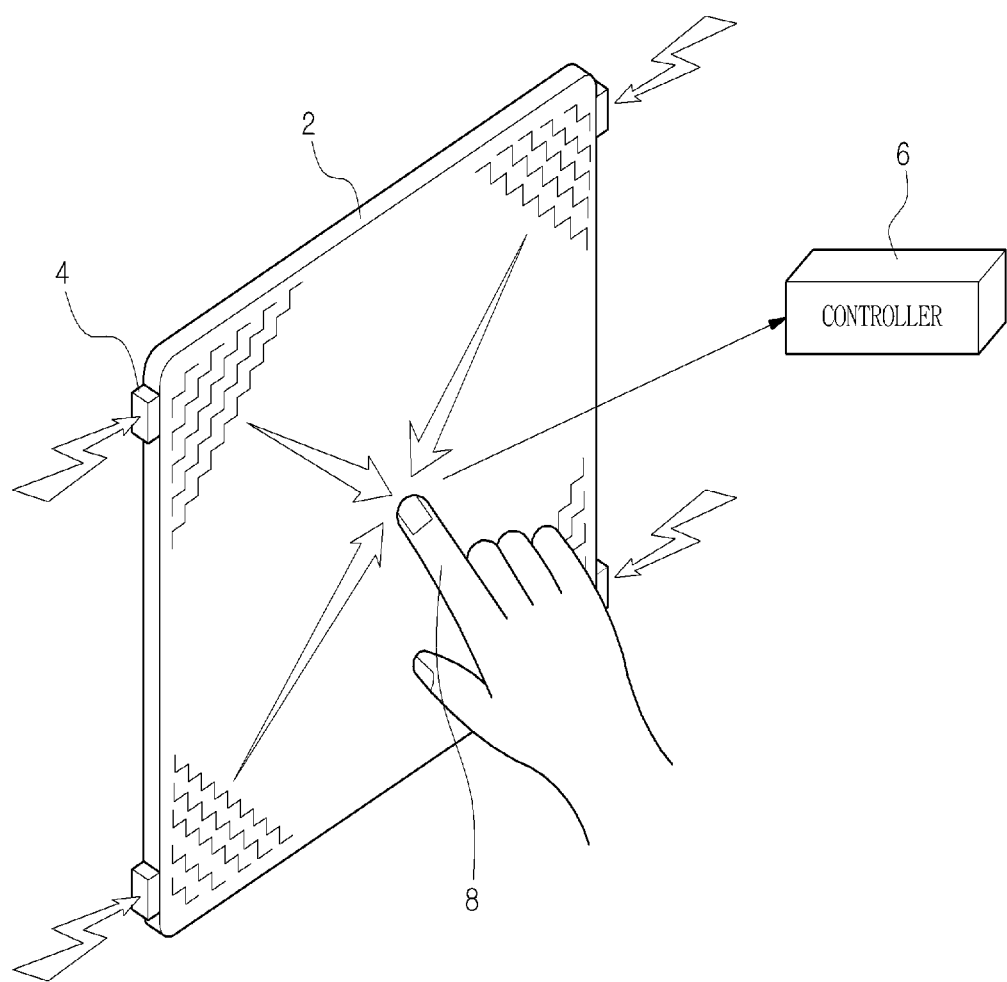

FIG. 2 [Prior Art]
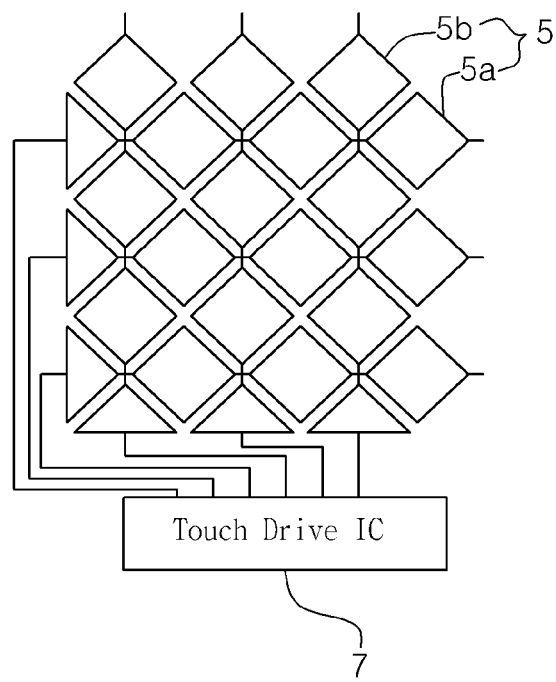
FIG. 3 [Prior Art]
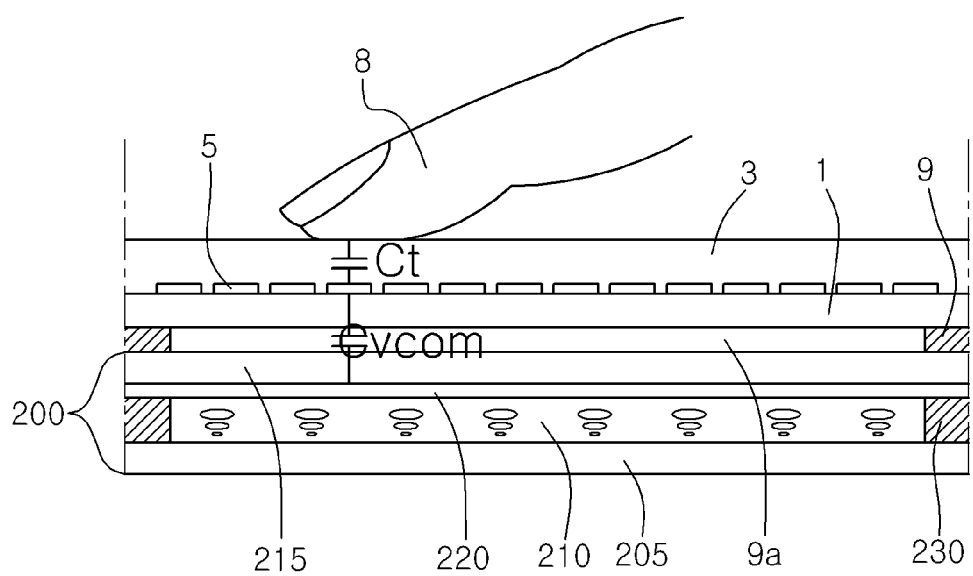

FIG. 4 [Prior Art]
FIG. 5
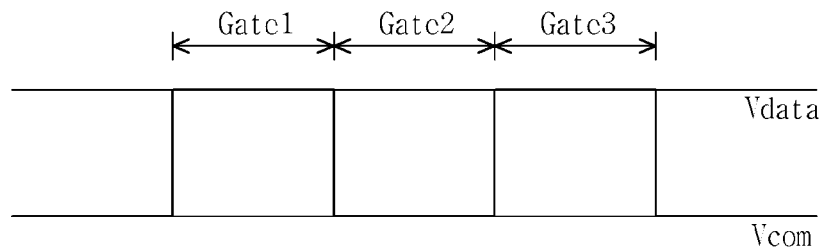
FIG. 6
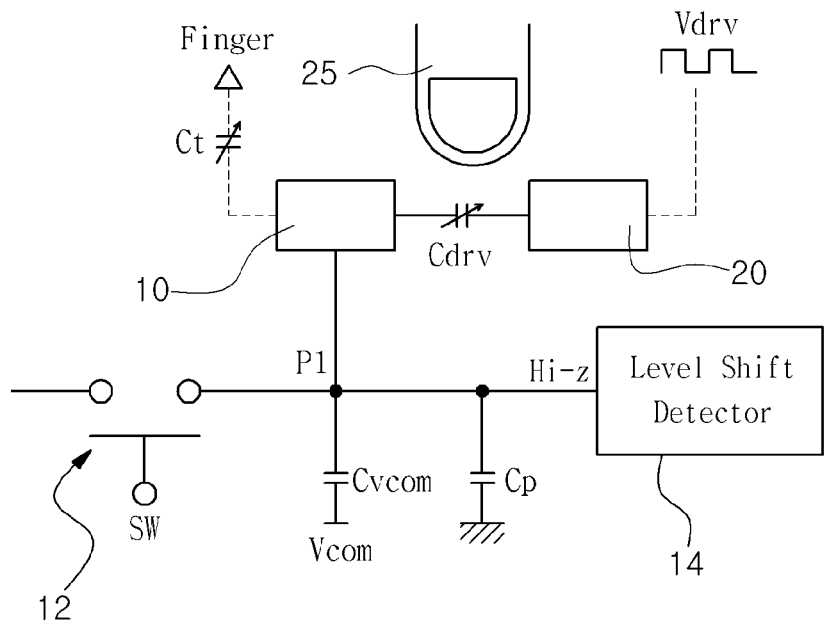

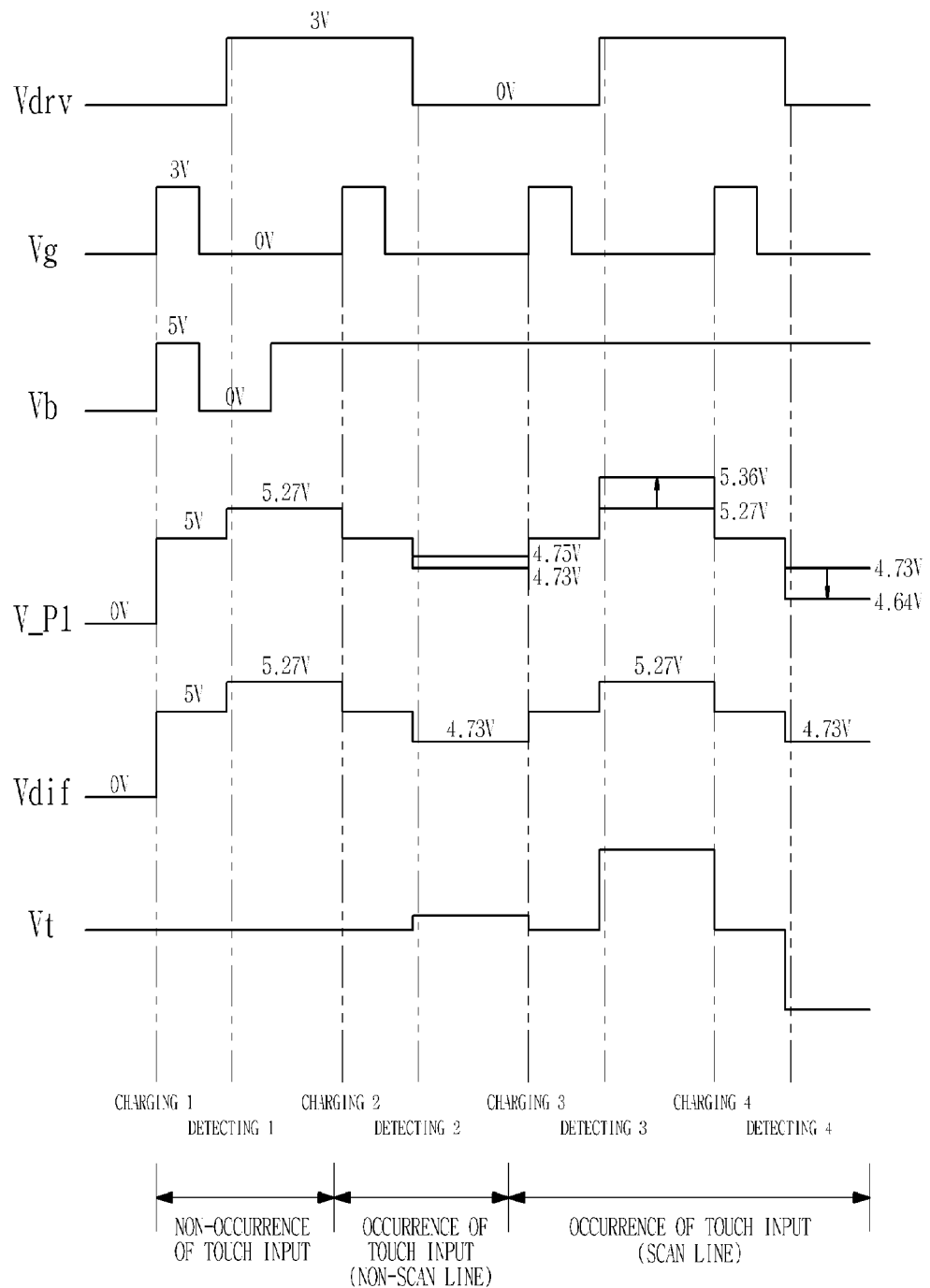

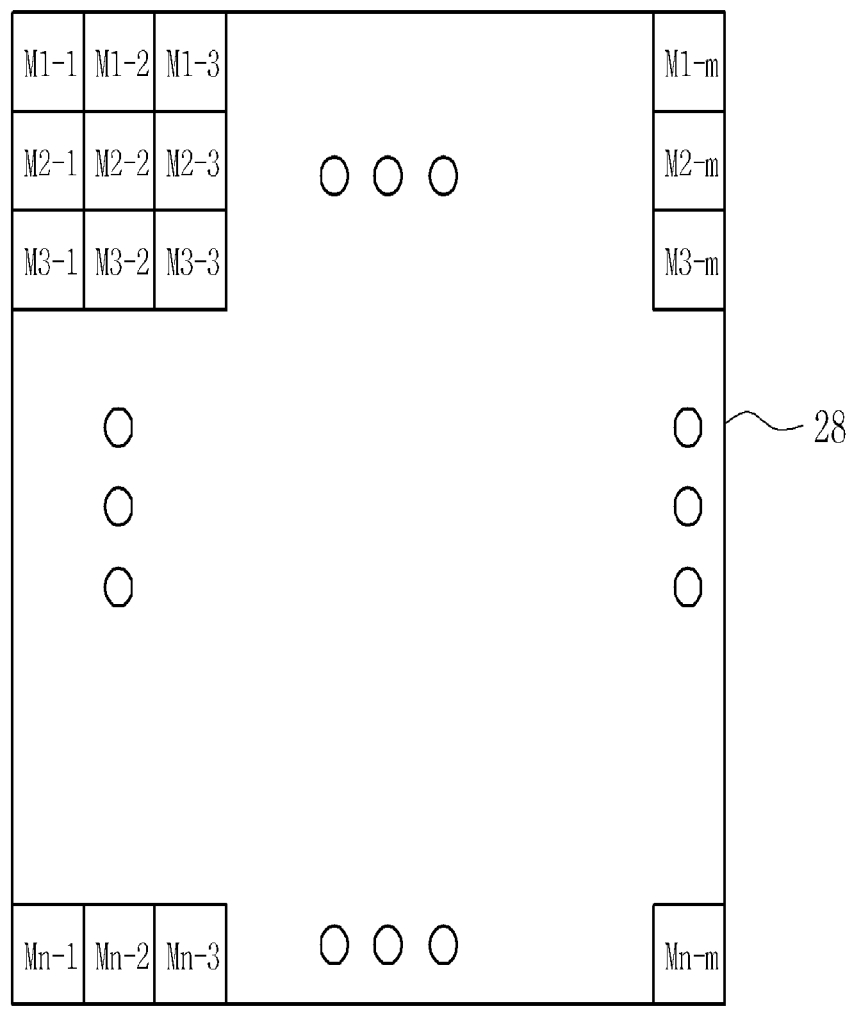

CAPACITIVE TOUCH DETECTING DEVICE AND METHOD AND CAPACITIVE TOUCH SCREEN PANEL USING LEVEL SHIFT, AND DISPLAY DEVICE USING THE CAPACITIVE TOUCH SCREEN PANEL

TECHNICAL FIELD

The present invention relates to a device, method, and screen panel for detecting a capacitive touch input of a bodily finger or a touch input instrument having conductive characteristics similar to the bodily finger, and more particularly, to a capacitive touch detecting device, a capacitive touch detecting method, and a touch screen panel, using a level shift, and a display device having a built-in touch screen panel, which detects whether or not a level shift phenomenon occurs in a detection signal of a detector by a variation of a driving capacitance and an added touch capacitance, to thus acquire a touch signal, when a touch capacitance due to a touch input is added to a driving capacitance formed between a driving pad and a sensor pad.

BACKGROUND ART

Usually, touch screen panels are input devices which are respectively attached onto display devices such as LCDs (Liquid Crystal Displays), PDPs (Plasma Display Panels), OLED (Organic Light Emitting Diode) displays, and AMOLED (Active Matrix Organic Light Emitting Diode) displays, to thus generate an input signal corresponding to a position where an object such as a finger or a touch pen is touched on the touch screen panel. The touch screen panels are widely used in various fields of mobile devices such as small-sized portable mobile phones, industrial terminal devices, and DIDs (Digital Information Devices).

Various types of conventional touch screen panels are disclosed, but resistive type touch screen panels having simple manufacturing processes and inexpensive manufacturing costs have been used most widely. The resistive type touch screen panels, however, have a low transmittance and undergo a pressure to be applied, respectively, to thereby cause an inconvenient use and also have difficulties in recognizing multiple touches and gestures, to thus cause detection errors to occur.

In contrast, capacitive touch screen panels may have a high transmittance, recognize soft, touches, and recognize multiple touches and gestures satisfactorily, to thus widen a market share gradually.

FIG. 1 shows an example of the structure of a conventional capacitive touch screen panel. Referring to FIG. 1, in the conventional capacitive touch screen panel, transparent conductive films are respectively formed on the top and bottom surfaces of a transparent substrate 2 made of plastic or glass. Metal electrodes 4 for applying a voltage are formed at each of four corners of the transparent substrate 2. The transparent conductive film is formed of transparent, metal such as ITO (Indium Tin Oxide) or ATO (Antimony Tin Oxide). The metal electrodes 4 respectively formed at the four corners of the transparent conductive film are formed by printing low resistivity conductive metal such as silver (Ag). A resistor network is formed around the metal electrodes 4. The resistor network is formed in a linearization pattern, in order to transmit a control signal equally on the entire surface of the transparent conductive film. A protective film is coated on top of the transparent conductive film including the metal electrodes 4.

In the case of the capacitive touch screen panel, when a high-frequency alternating-current (AC) voltage is applied to the metal electrodes 4, the high-frequency alternating-current (AC) voltage is spread to the whole surface of the transparent substrate 2. Here, if a finger 8 or a conductive touch input unit lightly touches the top surface of the transparent conductive film on the transparent substrate 2, a certain amount of electric current is absorbed into the human body and a change in the electric current is detected by a built-in electric current, sensor of a controller 6, to thus calculate the amount of electric current, at the four metal electrode 4, respectively, and to thereby recognize a touch point.

However, the capacitive touch screen panel shown in FIG. 1 detects the amount of micro-current, and requires an expensive detecting device, to thus raise the price of the capacitive touch screen panel, and make it difficult to recognize multiple touches.

In recent years, in order to overcome such problems, the capacitive touch screen panel shown in FIG. 2 has been chiefly used. The touch screen panel of FIG. 2 includes a transverse linear sensor pattern 5a, a longitudinal linear sensor pattern 5b, and a touch drive IC (Integrated Circuit) 7 for analyzing a touch signal. The touch screen panel detects a magnitude of a capacitance that is formed between the linear sensor pattern 5 and the finger 8. Here, the touch screen panel scans the transverse linear sensor pattern 5a and the longitudinal linear sensor pattern 5b to thus detect a touch signal and to thereby recognize a plurality of touch points.

However, when the touch screen panel is mounted on a display device such as a liquid crystal display (LCD) and is used, it may be difficult to detect a signal due to noise. For example, the liquid crystal display (LCD) uses a common electrode and an alternating-current (AC) common voltage Vcom is applied the common electrode in some cases. The alternating common voltage Vcom of the common electrode acts as noise when detecting touch points.

FIG. 3 shows an example in which a conventional capacitive touch screen panel is mounted on a liquid crystal display (LCD). A display device 200 such as the liquid crystal display (LCD) has a structure that liquid crystal is sealed and filled between a lower-side thin film transistor (TFT) substrate 205 and an upper-side color filter 215 to thereby form a liquid crystal layer 210. To seal the liquid crystal, the TFT substrate 205 and the color filter 215 are joined by sealants 230 at their outer portions. Although they are not shown, polarizing plates are attached on the top and bottom of the LCD panel, and besides optical sheets such as a back light unit (BLU) and a brightness enhancement film (BEF) are provided.

As shown, a touch screen panel is provided on top of the display device 200. The touch screen panel has a structure that the linear sensor pattern 5 is put on the upper surface of the substrate 1. A protection panel 3 for protecting the linear sensor pattern 5 is attached on top of the substrate 1. The touch screen panel is bonded to the outer portion of the display device 200 through the medium of an adhesive member 9 such as a double adhesive tape (DAT), and an air gap 9a is formed between the display device 200 and the touch screen panel.

In this configuration, if a touch occurs as shown in FIG. 3, a capacitance Ct is formed between the finger 8 and the linear sensor pattern 5. Meanwhile, as shown, a capacitance Cvcom is formed between the linear sensor pattern 5 and a common electrode 220 formed on the lower surface of the color filter 215 of the display device 200, and an unknown parasitic capacitance Cp also functions at the linear sensor pattern 5. Thus, the same circuit as an equivalent circuit, of FIG. 4 is configured.

Here, the conventional touch screen panel recognizes a touch by detecting an amount of change in the capacitance Ct, where the background components such as the capacitances Cvcom and Cp act as noise at the time of detecting the capacitance Ct. For example, small- and medium-sized LCDs for mobile devices employ a line inversion method in which the common voltage Vcom of the common electrode 220 alternates by one or a plurality of gate lines as shown in FIG. 5, in order to reduce current consumption, and thus the alternating electric field acts as considerable noise at the time of detection of touches.

Typically, in order to remove the noise, the air gap 9a is placed between the touch screen panel and the display device 200 as shown in FIG. 3. In addition, although it is not shown, an ITO layer is coated on the lower surface of the substrate 1 of the touch-screen panel, to thereby form a shield layer. In addition, the shield layer is grounded with the ground signal.

However, products become thick and the quality of the products deteriorates due to the air gap 9a. In addition, a separate process of configuring the shield layer is needed, thereby causing a rise of a manufacturing cost. In particular, in the case of forming a built-in touch screen panel in a liquid crystal display (LCD), it is very difficult to form the air gap 9a or the shield layer, and thus it is also very difficult to form the built-in touch screen panel in a display device such as the liquid crystal display (LCD).

DISCLOSURE

Technical Problem

In order to solve the above-mentioned problems of a conventional capacitive touch screen panel, it is an object of the present invention to provide a capacitive touch detecting device, a capacitive touch detecting method, and a touch screen panel, using a level shift, and a display device having a built-in touch screen panel, which includes a sensor pad and a driving pad spaced away from the sensor pad, and detects whether or not a level shift occurs in a voltage variation of the sensor pad depending upon an addition of a touch capacitance and a variation of a driving capacitance at the time of occurrence of a touch input by a touch input instrument when an alternating-current voltage is applied to the driving pad, to thus acquire a touch signal, and to thereby minimize an influence due to external noise, an influence due to a parasitic capacitance, and an influence due to a common electrode of the display device, and to thereby reliably detect touch signals, and simultaneously facilitate to incorporate a built-in touch screen panel in the display device such as a liquid crystal display (LCD).

Technical Solution

To attain the above object of the present invention, according to an aspect of the present invention, there is provided a capacitive touch detecting device for detecting occurrence of a touch capacitance (Ct) by an approach of a bodily finger (25) or a touch input instrument such as a conductor similar to the bodily finger, the capacitive touch detecting device comprising:

a sensor pad (10) that forms the touch capacitance (Ct) between the touch input instrument and the sensor pad (10), and forms a common electrode capacitance (Cvcom) between a common electrode (220) of a display device (200) and the sensor pad (10);

a driving pad (20) that is spaced away from the sensor pad (10) by the medium of an insulator (15), forms a driving capacitance (Cdrv) between the sensor pad (10) and the driving pad (20), and has an alternating voltage level alternating at a predetermined frequency;

a charging unit (12) that supplies a charge signal to the sensor pad (10) to thus accumulate charges in the touch capacitance (Ct), the common electrode capacitance (Cvcom), and the driving capacitance (Cdrv); and a level shift detecting unit (14) that is connected to the sensor pad (10), and that detects whether or not a level shift occurs in a voltage variation of the sensor pad (10) due to the alternating voltage level of the driving pad (20) when the touch capacitance (Ct) is added to the common electrode capacitance (Cvcom), at the time of occurrence of a touch input, with respect to another voltage variation of the sensor pad (10) due to the alternating voltage level of the driving pad (20), at the time of non-occurrence of a touch input, to thereby acquire a touch signal.

Preferably but not necessarily, a plurality of the sensor pads (10) are respectively connected with connectors (10a), to thus form linear sensor patterns (10b), and a plurality of driving pads (20) are respectively connected with connectors (20a), to thus form linear driving patterns (20b), in which part of the driving pad (20) overlaps part, of the sensor pad (10).

Preferably but not necessarily, the insulator (15) is about 100 Å to about 100 μm thick.

Preferably but not necessarily, an alternating voltage level is sequentially scanned and supplied to each of the linear driving patterns (20b).

Preferably but not necessarily, the common electrode (220) of the display device (200) has a direct-current (DC) voltage level.

Preferably but not necessarily, the voltage variation of the sensor pad (10) due to the driving capacitance (Cdrv), at the time of non-occurrence of a touch input is determined by following Equation 1, the voltage variation of the sensor pad (10) when the touch capacitance (Ct) is added to the common electrode capacitance (Cvcom), and the driving capacitance (Cdrv) varies, is determined by following Equation 3, and the level shift occurs due to a difference between the voltage variations of the following Equations 1 and 3, $$\Delta Vsensor = \pm(VdrvH - VdrvL)\frac{Cdrv}{Cdrv + Cvcom + Cp} \quad 1$$

$$\Delta Vsensor = \pm(VdrvH - VdrvL)\frac{Cdrv'}{Cdrv' + Cvcom + Cp + Ct}, \quad 3$$

in which ΔVsensor is a voltage variation in the sensor pad, VdrvH is a high level voltage of the AC voltage applied to the driving pad, VdrvL is a low level voltage of the AC voltage applied to the driving pad, Cdrv is the driving capacitance, Cdrv' is the driving capacitance that has varied due to the occurrence of a touch input, Cvcom is the common electrode capacitance, Cp is a parasitic capacitance, and Ct is a touch capacitance.

Preferably but not necessarily, the common electrode (220) of the display device (200) has a common voltage level alternating at a predetermined frequency.

Preferably but not necessarily, the alternating voltage level of the driving pad (20) is synchronized in-phase or anti-phase with the alternating voltage level of the common electrode (220).

Preferably but not necessarily, the voltage variation of the sensor pad (10) due to the driving capacitance (Cdrv), at the time of non-occurrence of a touch input is determined by following Equation 7, the voltage variation of the sensor pad (10) when the touch capacitance (Ct) is added to the common electrode capacitance (Cvcom), and the driving capacitance (Cdrv) varies, is determined by following Equation 9, and the level shift occurs due to a difference between the voltage variations of the following Equations 7 and 9, $$\Delta Vsensor = \pm(VdrvH - VdrvL)\frac{Cdrv + Cvcom}{Cdrv + Cvcom + Cp} \quad 7$$

$$\Delta Vsensor = \pm(VdrvH - VdrvL)\frac{Cdrv' + Cvcom}{Cdrv' + Cvcom + Cp + Ct}, \quad 9$$

in which $\Delta$Vsensor is a voltage variation in the sensor pad, VdrvH is a high level voltage of the AC voltage applied to the driving pad, VdrvL is a low level voltage of the AC voltage applied to the driving pad, Cdrv is the driving capacitance, Cdrv' is the driving capacitance that has varied due to the occurrence of a touch input, Cvcom is the common electrode capacitance, Cp is a parasitic capacitance, and Ct is a touch capacitance.

Preferably but not necessarily, the level shift detecting unit (14) detects the level shift in the sensor pad (10) at the rising time and/or falling time of the AC voltage level of the driving pad (20).

Preferably but not necessarily, the level shift detecting unit (14) detects a touch share of the touch input instrument with respect to the sensor pad (10) in correspondence to size of the level shift.

Preferably but not necessarily, the level shift detecting unit (14) comprises a signal detecting switching unit (16) whose on/off control terminal is connected to the sensor pad (10).

Preferably but not necessarily, the level shift detecting unit (14) comprises an amplifier (18) to amplify the signal from the sensor pad (10).

Preferably but not necessarily, the amplifier (18) is a differential amplifier (18a) to differentially amplify the signal from the sensor pad (10).

More preferably but not necessarily, a differential input signal of the differential amplifier (18a) is a signal corresponding to the voltage variation of the sensor pad (10) due to the driving capacitance (Cdrv) at the time of non-occurrence of a touch input.

Preferably but not necessarily, the capacitive touch detecting device further comprises a memory unit (28) that stores the output from the amplifier (18) for the sensor pad (10), to thus detect whether or not a touch input occurs for the sensor pad (10), with reference to the memory unit (28).

According to another aspect of the present invention, there is also provided a capacitive touch detecting method for detecting occurrence of a touch capacitance (Ct) by an approach of a bodily finger (25) or a touch input instrument such as a conductor similar to the bodily finger, the capacitive touch detecting method comprising the steps of:

(a) supplying a charging signal to a sensor pad (10) that forms a driving capacitance (Cdrv) between the sensor pad (10) and a driving pad (20) to which an alternating-current (AC) voltage alternating at a predetermined frequency, forms a common electrode capacitance (Cvcom) between a common electrode (220) of a display device (200) and the sensor pad (10), and forms the touch capacitance (Ct) between the touch input instrument and the sensor pad (10), to thus accumulate charges in the driving capacitance (Cdrv), the common electrode capacitance (Cvcom), and the touch capacitance (Ct);

(b) detecting a voltage variation in the sensor pad (10); and (c) detecting whether or not a level shift occurs in a voltage variation of the sensor pad (10) clue to the alternating voltage level of the driving pad (20) when the touch capacitance (Ct) is added to the common electrode capacitance (Cvcom), at the time of occurrence of a touch input, with respect to another voltage variation of the sensor pad (10) due to the alternating voltage level of the driving pad (20), at the time of non-occurrence of a touch input, to thereby acquire a touch signal.

Preferably but not necessarily, a plurality of the sensor pads (10) are respectively connected with connectors (10a), to thus form linear sensor patterns (10b), and a plurality of driving pads (20) are respectively connected with connectors (20a), to thus form linear driving patterns (20b), in which part of the driving pad (20) overlaps part of the sensor pad (10).

Preferably but not necessarily, the insulator (15) is about 100 Å to about 100 μm thick.

Preferably but not necessarily, an alternating voltage level is sequentially scanned and supplied to each of the linear driving patterns (20b).

Preferably but not necessarily, the common electrode (220) of the display device (200) has a direct-current (DC) voltage level.

Preferably but not necessarily, in step (c), the voltage variation of the sensor pad (10) due to the driving capacitance (Cdrv), at the time of non-occurrence of a touch input is determined by following Equation 1, the voltage variation of the sensor pad (10) when the touch capacitance (Ct) is added to the common electrode capacitance (Cvcom), and the driving capacitance (Cdrv) varies, is determined by following Equation 3, and the level shift occurs due to a difference between the voltage variations of the following Equations 1 and 3, $$\Delta Vsensor = \pm(VdrvH - VdrvL)\frac{Cdrv}{Cdrv + Cvcom + Cp} \quad 1$$

$$\Delta Vsensor = \pm(VdrvH - VdrvL)\frac{Cdrv'}{Cdrv' + Cvcom + Cp + Ct}, \quad 3$$

in which $\Delta$Vsensor is a voltage variation, in the sensor pad, VdrvH is a high level voltage of the AC voltage applied to the driving pad, VdrvL is a low level voltage of the AC voltage applied to the driving pad, Cdrv is the driving capacitance, Cdrv' is the driving capacitance that has varied due to the occurrence of a touch input, Cvcom is the common electrode capacitance, Cp is a parasitic capacitance, and Ct is a touch capacitance.

Preferably but not necessarily, the common electrode (220) of the display device (200) has a common voltage level alternating at a predetermined frequency.

Preferably but not necessarily, the alternating voltage level of the driving pad (20) is synchronized in-phase or anti-phase with the alternating voltage level of the common electrode (220).

Preferably but not necessarily, in step (c), the voltage variation of the sensor pad (10) due to the driving capacitance (Cdrv), at the time of non-occurrence of a touch input is determined by following Equation 7, the voltage variation of the sensor pad (10) when the touch capacitance (Ct) is added to the common electrode capacitance (Cvcom), and the driving capacitance (Cdrv) varies, is determined by following Equation 9, and the level shift occurs due to a difference between the voltage variations of the following Equations 7 and 9, $$\Delta Vsensor = \pm(VdrvH - VdrvL)\frac{Cdrv + Cvcom}{Cdrv + Cvcom + Cp} \qquad 7$$

$$\Delta Vsensor = \pm(VdrvH - VdrvL)\frac{Cdrv' + Cvcom}{Cdrv' + Cvcom + Cp + Ct}, \qquad 9$$

in which $\Delta Vsensor$ is a voltage variation in the sensor pad, VdrvH is a high level voltage of the AC voltage applied to the driving pad, VdrvL is a low level voltage of the AC voltage applied to the driving pad, Cdrv is the driving capacitance, Cdrv' is the driving capacitance that has varied due to the occurrence of a touch input, Cvcom is the common electrode capacitance, Cp is a parasitic capacitance, and Ct is a touch capacitance.

Preferably but not necessarily, in step (c), the level shift in the sensor pad (10) is detected at the rising time and/or falling time of the AC voltage level of the driving pad (20).

Preferably but not necessarily, in step (c), a step of detecting a touch share of the touch input instrument, with respect to the sensor pad (10) in correspondence to size of the level shift is further comprised for the level shift detecting step.

Preferably but not necessarily, in step (c), a signal detecting switching unit (16) whose on/off control terminal is connected to the sensor pad (10) is used for the level shift detecting step.

Preferably but not necessarily, in step (c), an amplifier (18) is used to amplify the signal from the sensor pad (10), for the level shift detecting step.

Preferably but not necessarily, the amplifier (18) is a differential amplifier (18a) to differentially amplify the signal from the sensor pad (10).

More preferably but not necessarily, a differential input signal of the differential amplifier (18a) is a signal corresponding to the voltage variation of the sensor pad (10) due to the driving capacitance (Cdrv) at the time of non-occurrence of a touch input.

Preferably but not necessarily, the capacitive touch detecting method further comprises the steps of storing the output from the amplifier (18) for the sensor pad (10) in a memory unit (28), and detecting whether or not a touch input occurs for the sensor pad (10), with reference to the memory unit (28).

According to still another aspect of the present invention, there is still also provided a capacitive touch screen panel using a level shift, for detecting occurrence of a touch capacitance (Ct) by an approach of a bodily finger (25) or a touch input instrument such as a conductor similar to the bodily finger, the capacitive touch screen panel comprising:

a substrate (50);

a sensor pad (10) that is formed on top of the substrate (50), and that forms the touch capacitance (Ct) between the touch input instrument and the sensor pad (1.0), and forms a common electrode capacitance (Cvcom) between a common electrode (220) of a display device (200) and the sensor pad (10);

a driving pad (20) that is spaced away from the sensor pad (10) by the medium of an insulator (15), forms a driving capacitance (Cdrv) between the sensor pad (10) and the driving pad (20), and has an alternating voltage level alternating at a predetermined frequency;

a charging unit (12) that supplies a charge signal to the sensor pad (10) to thus accumulate charges in the touch capacitance (Ct), the common electrode capacitance (Cvcom), and the driving capacitance (Cdrv);

a level shift detecting unit (14) that is connected to the sensor pad (10), and that detects whether or not a level shift occurs in a voltage variation of the sensor pad (10) due to the alternating voltage level of the driving pad (20) when the touch capacitance (Ct) is added to the common electrode capacitance (Cvcom), at the time of occurrence of a touch input, with respect to another voltage variation of the sensor pad (10) due to the alternating voltage level of the driving pad (20), at the time of non-occurrence of a touch input, to thereby acquire a touch signal; and a drive integrated circuit (IC) (30) that supplies a charging signal to the sensor pad (30) through the charging unit (12) and calculates touch coordinates from the output from the level shift detecting unit (14).

Preferably but not necessarily, in an active region of the substrate (50), a plurality of the sensor pads (10) are respectively connected with connectors (10a), to thus form linear sensor patterns (10b), and a plurality of driving pads (20) are respectively connected with connectors (20a), to thus form linear driving patterns (20b), in which part of the driving pad (20) overlaps part of the sensor pad (10).

Preferably but not necessarily, the insulator (15) is about 100 Å to about 100 µm thick.

Preferably but not necessarily, the drive IC (30) sequentially scans and supplies an alternating voltage level to each of the linear driving patterns (20b).

Preferably but not necessarily, the common electrode (220) of the display device (200) has a direct-current (DC) voltage level.

Preferably but not necessarily, the voltage variation of the sensor pad (10) due to the driving capacitance (Cdrv), at the time of non-occurrence of a touch input is determined by following Equation 1, the voltage variation of the sensor pad (10) when the touch capacitance (Ct) is added to the common electrode capacitance (Cvcom), and the driving capacitance (Cdrv) varies, is determined by following Equation 3, and the level shift occurs due to a difference between the voltage variations of the following Equations 1 and 3, $$\Delta Vsensor = \pm(VdrvH - VdrvL)\frac{Cdrv}{Cdrv + Cvcom + Cp} \qquad 1$$

$$\Delta Vsensor = \pm(VdrvH - VdrvL)\frac{Cdrv'}{Cdrv' + Cvcom + Cp + Ct}, \qquad 3$$

in which $\Delta Vsensor$ is a voltage variation in the sensor pad, VdrvH is a high level voltage of the AC voltage applied to the driving pad, VdrvL is a low level voltage of the AC voltage applied to the driving pad, Cdrv is the diving capacitance, Cdrv' is the driving capacitance that has varied due to the occurrence of a touch input, Cvcom is the common electrode capacitance, Cp is a parasitic capacitance, and Ct is a touch capacitance.

Preferably but not necessarily, the common electrode (220) of the display device (200) has a common voltage level alternating at a predetermined frequency.

Preferably but not necessarily, the alternating voltage level of the driving pad (20) is synchronized in-phase or anti-phase with the alternating voltage level of the common electrode (220).

Preferably but not necessarily, the voltage variation of the sensor pad (10) due to the driving capacitance (Cdrv), at the time of non-occurrence of a touch input is determined by following Equation 7, the voltage variation of the sensor pad (10) when the touch capacitance (Ct) is added to the common electrode capacitance (Cvcom), and the driving capacitance (Cdrv) varies, is determined by following Equation 9, and the level shift occurs due to a difference between the voltage variations of the following Equations 7 and 9, $$\Delta Vsensor = \pm (VdrvH - VdrvL)\frac{Cdrv + Cvcom}{Cdrv + Cvcom + Cp} \quad 7$$

$$\Delta Vsensor = \pm (VdrvH - VdrvL)\frac{Cdrv' + Cvcom}{Cdrv' + Cvcom + Cp + Ct}, \quad 9$$

in which ΔVsensor is a voltage variation in the sensor pad, VdrvH is a high level voltage of the AC voltage applied to the driving pad, VdrvL is a low level voltage of the AC voltage applied to the driving pad, Cdrv is the driving capacitance, Cdrv' is the driving capacitance that has varied due to the occurrence of a touch input, Cvcom is the common electrode capacitance, Cp is a parasitic capacitance, and Ct is a touch capacitance.

Preferably but not necessarily, the level shift detecting unit (14) detects the level shift in the sensor pad (10) at the rising time and/or falling time of the AC voltage level of the driving pad (20).

Preferably but not necessarily, the level shift detecting unit (14) detects a touch share of the touch input instrument with respect to the sensor pad (10) in correspondence to size of the level shift.

Preferably but not necessarily, the level shift detecting unit (14) comprises a signal detecting switching unit (16) whose on/off control terminal is connected to the sensor pad (10).

Preferably but not necessarily, the level shift detecting unit (14) comprises an amplifier (18) to amplify the signal from the sensor pad (10).

Preferably but not necessarily, the amplifier (18) is a differential amplifier (18a) to differentially amplify the signal from the sensor pad (10).

More preferably but not necessarily, a differential input signal of the differential amplifier (18a) is a signal corresponding to the voltage variation of the sensor pad (10) due to the driving capacitance (Cdrv) at the time of non-occurrence of a touch input.

Preferably but not necessarily, the capacitive touch detecting device further comprises a memory unit (28) that stores the output from the amplifier (18) for the sensor pad (10), to thus detect whether or not a touch input occurs for the sensor pad (10), with reference to the memory unit (28).

Preferably but not necessarily, the drive IC (30) is mounted on one side of the substrate (50), in the form, of a COG (Chip On Glass) pattern or a COF (Chip On Film) pattern.

Preferably but not necessarily, a protection panel (52) is further attached on the upper surface of the substrate (50).

Preferably but not necessarily, the substrate (50) is one of a substrate that is built in a display device (200) and a substrate constituting the display device (200).

According to yet another aspect of the present invention, there is yet also provided a display device having a built-in capacitive touch screen panel, in which the capacitive touch screen panel is any one of the above-described capacitive touch screen panels, or any one substrate of substrates having basic configuration has a configuration of the above-described substrate (50).

Preferably but not necessarily, the display device (200) is a liquid crystal display (LCD) device, and the substrate (50) is a color filter (215) of the LCD device.

Preferably but not necessarily, the drive IC (30) is integrated in a drive IC for display screen of the display device (200).

Advantageous Effects

In the case of a capacitive touch detecting device using a level shift, a capacitive touch detecting method using the level shift, a capacitive touch screen panel using the level shift, and a display device with a built-in capacitive touch screen panel, according to the present invention, a driving pad is formed at a distance spaced away from a sensor pad, a voltage alternating at a given frequency is scanned and supplied to the driving pad line by line, to thereby detect whether or not a level shift occurs in an input end of a level shift detecting unit depending upon, an addition of a touch capacitance and a variation, of a driving capacitance at the time of occurrence of a touch input, and to thus acquire a touch signal. As a result, influences due to a parasitic capacitance generated by vertical noise, a coupling phenomenon, or other factors from the display device are minimized, and erroneous recognition of signals does not occur. In addition, a touch input is detected at a relatively high voltage level, to thus easily capture a signal even with a small cross-sectional area of a touch input instrument, and to thereby make it possible to perform a stylus pen input. In addition, the present invention obtains a touch share of a touch input instrument depending on size of a shift level, to thus increase a touch resolution and enable fine handwriting and drawing.

DESCRIPTION OF DRAWINGS

The above and other objects and advantages of the invention will become more apparent by describing the preferred embodiments with reference to the accompanying drawings in which:

FIG. 1 is a perspective view showing an example of a conventional capacitive touch screen panel;

FIG. 2 is a plan view showing another example of a conventional capacitive touch screen panel;

FIG. 3 is a cross-sectional view showing an example in which a touch screen panel of FIG. 2 is mounted on top of a display device;

FIG. 4 is an equivalent circuit, diagram showing that a touch capacitance is detected in FIG. 3;

FIG. 5 is a waveform diagram illustrating an alternating-current (AC) voltage waveform of a liquid crystal display device;

FIG. 6 is a circuit diagram illustrating a touch detecting device according to the present invention;

FIG. 15 is waveform diagram illustrating a process of detecting a touch signal; and FIG. 16 is a schematic view showing a configuration of a memory unit.

BEST MODE

Figure 7:
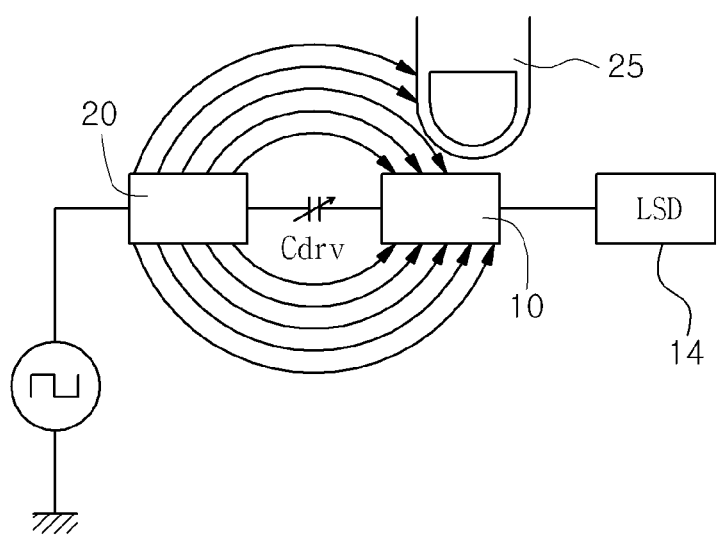
FIG. 7 is a schematic view of a variation of a driving capacitance.

Hereinbelow, preferred embodiments of the present invention will be described in detail with reference to the accompanying drawings.

First, the present invention relates to a capacitive touch detecting device using a level shift, a capacitive touch detecting method using the level shift, a capacitive touch screen panel using the level shift, and a display device with a built-in capacitive touch screen panel. A conventional capacitive touch detecting device detects a change in capacitance due to contact of a finger and the like, but the capacitive touch detecting device according to the present invention configures a combination of driving pads to which an alternating-current (AC) voltage is sequentially applied, electrically insulates the driving pads 20 from sensor pads 10, and detects a voltage variation caused by a correlation between a driving capacitance occurring between both the driving and sensor pads and a touch capacitance occurring in the sensor pad. A touch detecting system according to the present invention compares a voltage variation that is established by a driving pad capacitance between a driving pad and a sensor pad at the time of non-occurrence of a touch input, with a voltage variation that is generated when the driving pad capacitance varies and a touch capacitance is added at the time of occurrence of a touch input, and detects a level shift that is a difference in magnitudes between the two voltage variations, to thus minimize influences caused by noise or a parasitic capacitance generated from a display device, and to thereby acquire a touch signal more reliably.

The present invention detects a non-contact touch input of a finger or a touch input instrument having electrical characteristics similar to the finger. Here, the term "non-contact touch input" means that a touch input instrument of a finger and the like performs a touch input at a state spaced by a predetermined distance apart from a sensor pad by a substrate, a protection panel, or the like. The touch input instrument may contact an outer surface of the substrate. However, even in this case, the touch input, instrument and the sensor pad remain in a non-contact state. Therefore, a touch action of a finger on a sensor pad may be expressed in a term "approach." Meanwhile, since a finger may remain in a contact state for an outer surface of the substrate, a touch action of a finger on the substrate may be expressed in the term "contact." In this specification and claims, the terms "approach" and "contact" are commonly used as the same meanings as above.

The components such as "~ portion" are configurational elements that perform certain functions and mean software configurational elements or hardware configurational elements such as FPGA (Field-Programmable Gate Array) or ASIC (Application Specific Integrated Circuit). However, the components such as "~ portion" are not limited to the software or hardware configurational elements. For example, the software or hardware configurational elements can be configured into an addressable storage medium, or can be configured to reproduce one or more processors. As an example, the software or hardware configurational elements such as "~ portion" can include some processes, functions, properties, subroutines, segments of program codes, firmware, microcodes, databases, and variables. In addition, the software or hardware configurational elements such as "~ portion" can be included in larger components or can include smaller components. In addition, the software or hardware configurational elements such as "~ portion" may contain their own central processing units (CPUs) therein.

In the following drawings, thickness or areas have been enlarged to definitely show several layers and areas. Through the whole detailed description of the specification, like reference numerals are used for like elements. When it is mentioned that a portion such as a layer, a film, an area and a substrate is placed "on" or "on the upper surface" of another portion, this means that the portion is not only placed "justly on" the other portion but also the former is placed on a third portion between the former and the latter. In contrary, when it is mentioned that a certain portion is placed "justly on" another portion, this means that there are no other portions between them. In addition, the signal described herein, collectively refer to, unless otherwise stated, voltage or current.

Figure 8:
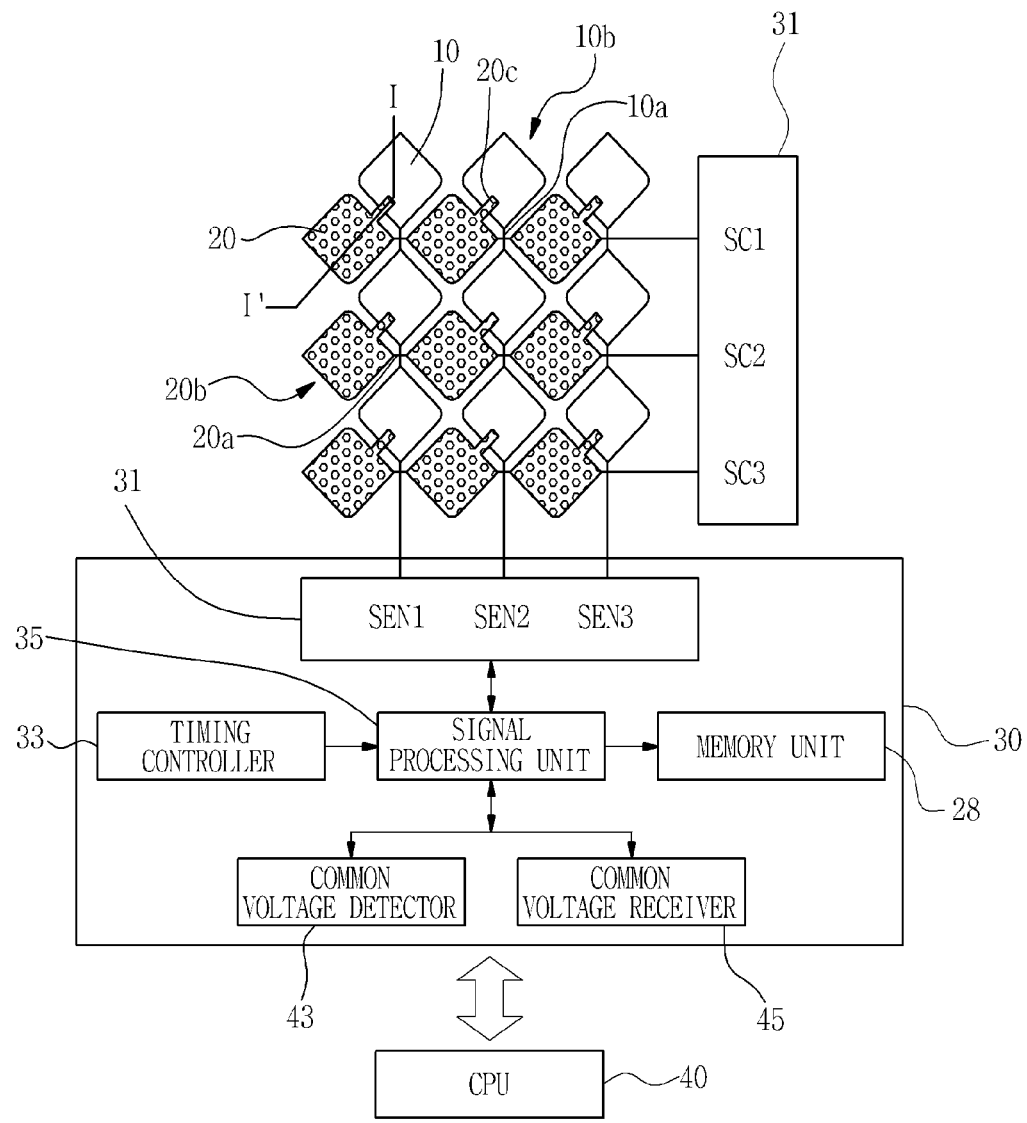
FIG. 8 is a block diagram showing a configuration of patterns of sensor pads and driving pads according to the present invention.
Figure 9:
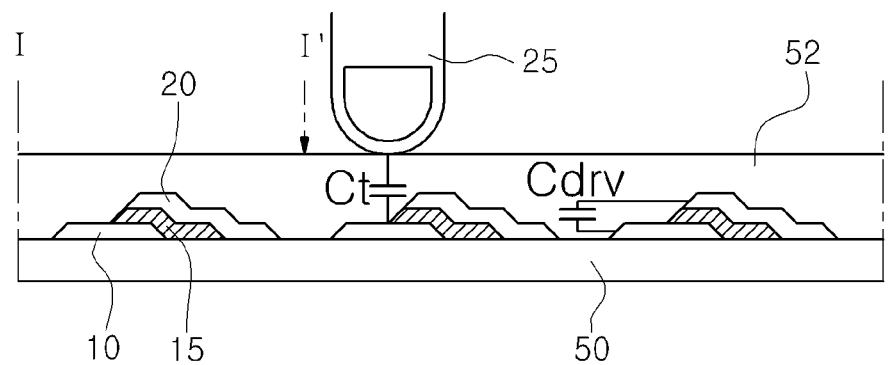
FIG. 9 is a cross-sectional view cut along line I-I' of FIG. 8.

FIG. 6 is a circuit diagram illustrating a touch detecting device according to the present invention. FIG. 7 is a schematic view of a variation of a driving capacitance. FIG. 8 is a block diagram showing a configuration of patterns of sensor pads and driving pads according to the present invention. FIG. 9 is a cross-sectional view cut along line I-I' of FIG. 8.

Referring first to FIG. 6, the touch detecting device according to the present invention includes a sensor pad 10, a driving pad 20, a charging unit 12, and a level shift detector (LSD) 14.

The sensor pad 10 is an electrode patterned to detect a touch input. A touch capacitance Ct is formed between the sensor pad 10 and a finger 25 of a human, body, or a touch input instrument such as an electric conductor similar to the finger, and a common electrode capacitance Cvcom is formed between the sensor pad 10 and a common electrode 220 of a display device 200 (of FIG. 10). The sensor pad 10 is formed as a transparent electric conductor in the case that a touch screen panel is put on the display device 200. For example, the sensor pad 10 is formed of a transparent material, such as ITO (Indium Tin Oxide), ATO (Antimony Tin Oxide), CNT (Carbon Nano Tube), or IZO (Indium Zinc Oxide) or a transparent material with conductive characteristics similar to the ITO, ATO, CNT, or IZO. In the case of a touch screen panel such as a touch keyboard or a touch pad that is not mounted on the display device, the sensor pad 10 may be formed of metal.

The driving pad 20 is an electrode spaced apart from the sensor pad 10. As shown in FIG. 6, an alternating-current (AC) voltage alternating at a given frequency is applied to die driving pad 20. The driving pad 20 is an electrode that is patterned on a substrate 50 in the same manner as that, of the sensor pad 10. The driving pad 20 is preferably formed of a transparent material, such as ITO, ATO, CNT, or IZO.

An insulator 15 is provided between the driving pad 20 and the sensor pad 10. In addition, a driving capacitance Cdrv is formed between the driving pad 20 and the sensor pad 10. The driving capacitance Cdrv varies by a touch event of a finger 25. It is assumed that the finger 25 of the human body is a floating dielectric material. As shown in FIG. 7, if a finger 25 is made to approach the sensor pad 10, an electric field between the sensor pad 10 and the driving pad 20 varies and thus a value of the driving capacitance Cdrv becomes large. This is because the number of the electric force lines flowing from the driving pad 20 to the sensor pad 10 increases when the finger 25 of the human body approaches the sensor pad 10.

In contrast, when the finger 25 of the human body is grounded, an electric field shield model is applied. In this case, an electric field is shielded by an approach of die finger 25, but the driving capacitance Cdrv becomes small conversely. This is because the number of the electric force lines decreases due to the reason why some of the electric force lines from the driving pad 20 are blocked by the finger 25 when the finger 25 of the human body approaches the sensor pad 10.

FIG. 8 is a block diagram showing a configuration of patterns of sensor pads 10 and driving pads 20. In the example of FIG. 8, the sensor pads 10 and the driving pads 20 are illustrated in the form of a diamond, respectively, but a shape of each pad may be changed in various forms such as a circle, a triangle, or a rectangle. In addition, the sensor pads 10 and the driving pads 20 have been respectively illustrated as an example of a resolution of 3*3, for only understanding of the present invention, but are actually arranged to have a higher resolution (for example, 18*30 or 24*40).

A shown, a plurality of the sensor pads 10 are respectively connected with connectors 10a, to thus form linear sensor patterns 10b. In the illustration of FIG. 8, the linear sensor patterns 10b are arranged in a column direction. A plurality of driving pads 20 are also respectively connected with connectors 20a, to thus form linear driving patterns 20b. The linear driving patterns 20b are arranged in a row direction. The linear sensor patterns 10b and the linear driving patterns 20b are mutually crossed at the connectors 10a and 20a, respectively. Each of the connectors 10a and 20a is mutually insulated at each of joints.

Part of each of the driving pads 20 overlaps part of one of the sensor pads 10. As shown in FIG. 8, part of a diamond pattern of each of the driving pads 20 is protruded to cover the upper surface of one of the sensor pads 10, to thus form an overlap region 20c. In addition, referring to the cross-sectional view of FIG. 9, it can be seen that the sensor pad 10 is formed on the upper surface of the substrate 50, the insulator 15 is formed on the upper surface of the sensor pad 10, and the driving pad 20 is formed on the upper surface of the insulator 15.

The thicker the insulator 15 is, the smaller the size of the driving capacitance Cdrv and the light transmittance become. Thus, it is preferable to maintain the insulator 15 to have a predetermined thickness. As an example, the insulator 15 is about 100 Å to about 100 μm thick.

In the illustration of FIG. 9, a protection panel 52 is mounted on the upper surface of the substrate 50. The protection panel 52 plays a role of maintaining an interval so that the sensor pad 10 is spaced by a predetermined distance away from die finger 25, and simultaneously preventing durability of the display device 200 from being degraded. The protection panel 52 may be made of a material such as reinforced glass or a transparent acryl resin.

Meanwhile, both the sensor pad 10 and the driving pad 20 may be positioned under the substrate 50. In this case, the substrate 50 plays a role of the protection panel 52. In addition, the driving pad 20 may be first formed on the upper surface of the substrate 50, and then the insulator 15 and the sensor pad 10 are sequentially deposited on the driving pad 20.

Figure 10:
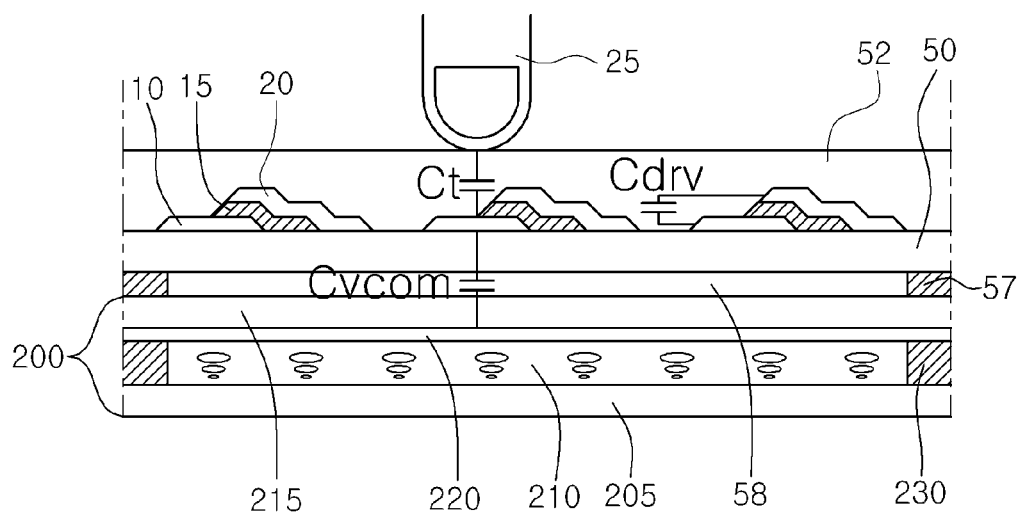
FIG. 10 is a cross-sectional view showing a configuration, in which a touch screen panel is mounted on a display device.
Figure 11:
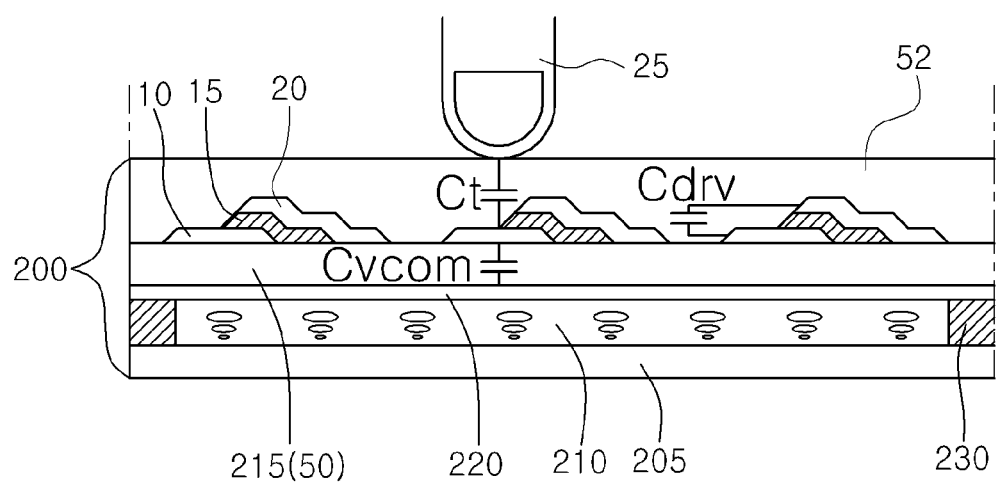
FIG. 11 is a cross-sectional view showing a configuration in which a touch screen panel is built in a display device.

FIGS. 10 and 11 are schematic cross-sectional views showing examples of mounting a touch screen panel, respectively, in which a touch screen panel according to the present invention is mounted on a liquid crystal display device (LCD). As shown, in general, the LCD has a common electrode 220 (which is called a Vcom electrode). The display device 200 will be briefly described as follows.

The display device 200 has a structure in which liquid crystal is sealed and filled between a lower TFT substrate 205 and an upper color filter 215, to thus form a liquid crystal layer 210. To seal the liquid crystal, the TFT substrate 205 and the color filter 215 are joined by sealants 230 at their outer portions. Although they are not shown, polarizing plates are attached on the top and bottom of the LCD panel, and besides optical sheets such as a back light unit (BLU) and a brightness enhancement film (BEF) are provided.

In the embodiment of FIG. 10, as shown, a substrate 50 for a touch screen panel is provided on top of the display device 200. The substrate 50 is attached to the upper portion of the display device 200 at the outer portion thereof, through the medium of an adhesive member 57 such as a double adhesive tape (DAT), and an air gap 58 is formed between the substrate 50 and the display device 200. Otherwise, although it is not shown in the drawings, the substrate 50 may be directly attached on the upper portion of the display device 200 without forming the air gap with an ultraviolet curable resin, a silicon resin, etc.

In the embodiment of FIG. 11, touch components such as those of FIG. 9 may be directly mounted on the upper portion of the color filter 215 of the display device 200. That is, the color filter 215 functions as the substrate 50 for the touch screen panel. Such a structure has an advantage that a touch screen panel is manufactured together in the process of manufacturing the display device 200, which is called an on-cell method.

The common electrode 220 of the display device 200 has a direct-current (DC) voltage in a dot inversion method, but has an alternating voltage level in a line inversion or column inversion method. As shown in FIGS. 10 and 11, a common electrode capacitance Cvcom is formed between the sensor pad 10 and the common electrode 220 in both the inversion methods.

The aforementioned Cdrv, Ct and Cvcom are symbols that represent both the name and magnitude of capacitors, respectively. For example, the symbol "Ct" means a capacitor named Ct and having a capacitance Ct in magnitude.

Referring back to FIG. 6, the charging unit 12 is a unit for selectively supplying a charging signal to the sensor pad 10 at a required point in time. The charging unit 12 is a linear device such as a 3-terminal switching device that performs a switching operation in accordance with a control signal supplied to an on/off control terminal, or an operational amplifier (OP-AMP) that supplies a signal according to a control signal. For example, the charging unit 12 is any one of a relay switch, a MOS (Metal Oxide Semiconductor) switch, a BJT (Bipolar Junction Transistor) switch, a FET (Field Effect Transistor) switch, a MOSFET (Metal Oxide Semiconductor Field Effect Transistor) switch, an IGBT (Insulated Gate Bipolar Transistor) switch, and a TFT (Thin Film Transistor) switch.

For instance, the relay switch is a device in which a voltage or current applied to an input terminal thereof is output without loss when the current is applied to a control terminal thereof. The BJT switch is a device in which a certain amount of amplified current flows from a collector terminal thereof to an emitter terminal thereof when a current is applied to a base terminal thereof at a state where a current higher than a threshold voltage of the base terminal has been applied to the base terminal. In addition, the TFT switch is a switching device that is used in a pixel unit for a LCD or AMOLED, and includes a gate terminal that is a control terminal, and a drain terminal and a source terminal that are input and output terminals, respectively, in which the TFT switch is energized when a voltage higher than a threshold voltage higher than a voltage applied to the source terminal is applied to the gate terminal, and thus a current depending on the magnitude of a voltage applied to the gate terminal flows from the input terminal to the output terminal. Besides, a variety of devices such as an operational amplifier (OP-AMP) having an enable terminal and a disable terminal, and a flip-flop may be used as the charging unit 12.

Figure 12:
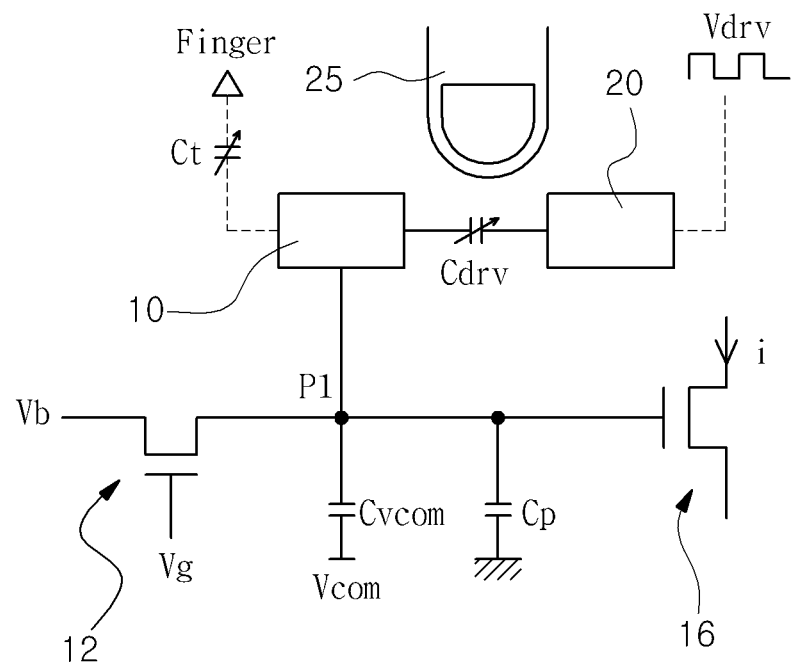
FIG. 12 is a circuit diagram showing an example of a level shift detector.
Figure 13:
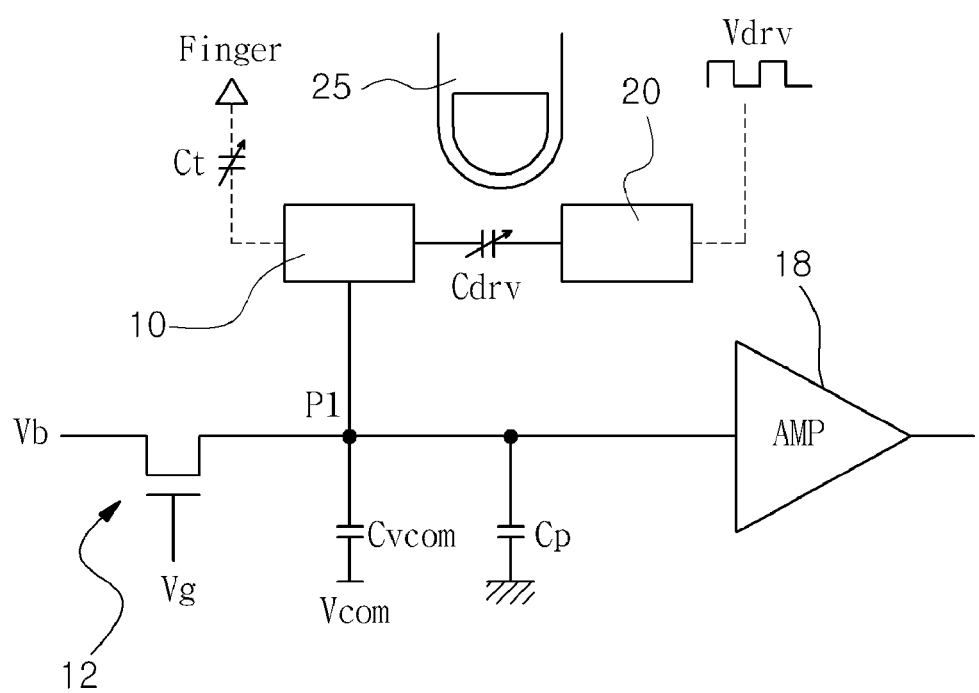
FIG. 13 is a circuit diagram showing another example of a level shift detector.
Figure 14:
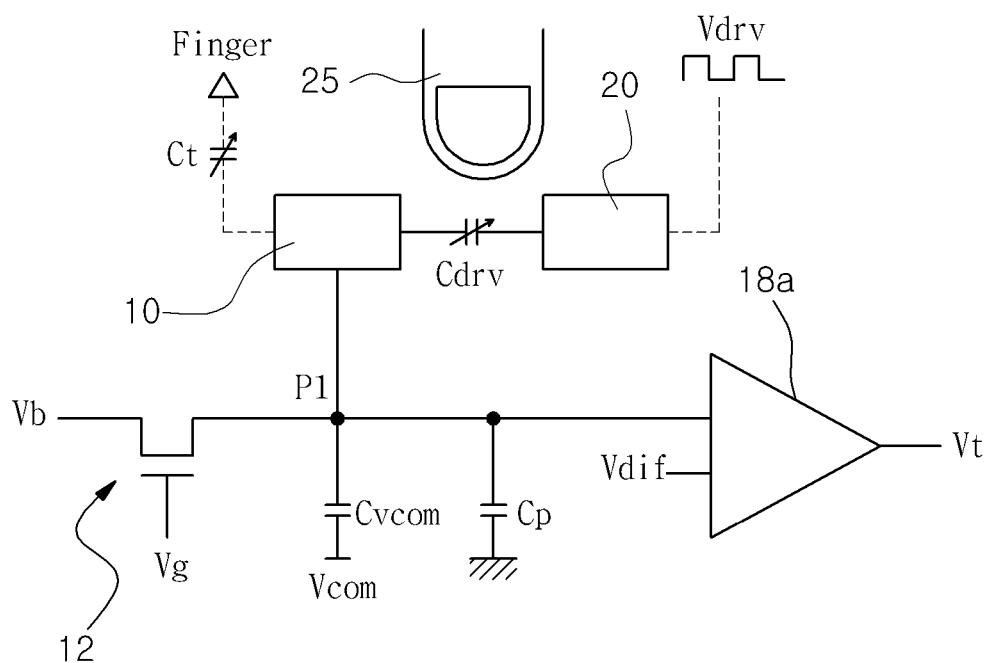
FIG. 14 is a circuit, diagram showing still another example of a level shift detector.

As shown in FIG. 6, the capacitances acting on the sensor pad 10 are the driving capacitance Cdrv, the common electrode capacitance Cvcom, the touch capacitance Ct, and the parasitic capacitance Cp. When a charging signal is applied through the charging unit 12, the capacitors such as Cdrv, Cvcom, Ct, and Cp will be all charged. Thereafter, if the charging unit 12 is turned off, the charged signals are isolated unless the signals charged in each capacitor are discharged in a separate way. To stably isolate the charged signals, it is preferable that a 3-terminal switching device is used as the charging unit 12, as shown in FIGS. 12 to 14, and the input end of the level shift detector 14 has a high-impedance (or Hi-z) state. If a touch input is observed while discharging the charged signals, the charged signals are isolated in the other ways, or the signals are quickly observed at a discharge initiation time, there is no need to inevitably have a high-impedance (or Hi-z) state at the input end of the level shift, detector 14.

The level shift detector 14 detects whether or not a signal level of the sensor pad 10 is shifted. Preferably, the level shift detector 14 detects whether or not a level shift occurs in a voltage variation of the sensor pad 10 at the time of occurrence of a touch input (that is, when Ct is added in parallel to Cdrv, etc., and the Cdrv varies), in contrast to a voltage variation of the sensor pad 10 at the time of non-occurrence of a touch input (that is, when Ct is not formed), to thus acquire a touch signal.

The level shift detector 14 may have a wide variety of devices or circuit configuration. For instance, the level shift detector 14 may include an amplifier to amplify a signal from the sensor pad 10, an analog to digital converter (ADC), a voltage to frequency converter (VFC), a flip-flop, a latch, a buffer, a transistor (TR), a thin film transistor (TFT), a comparator, etc., or a combination of these components.

In the embodiment of FIG. 12, the level shift detector 14 comprises a signal detecting switching device 16. As an example, the signal detecting switching device 16 is a thin film transistor (TFT). Referring to FIG. 12, the on/off control terminal of the signal detecting switching device 16 is connected to the sensor pad 10. Thus, the current "i" flowing through the input/output terminals of the signal detecting switching device 16 is controlled by the electric potential of the sensor pad 10. Thus, a level shift that is caused by occurrence of a touch input may be read by detection of a change of the current "i."

FIGS. 13 and 14 show other examples of the level shift detector 14. Referring to FIG. 13, the level shift detector 14 includes an amplifier 18 whose input, terminal is connected to the sensor pad 10. Since the input terminal of the amplifier 18 is also maintained in the Hi-z state that is the high impedance state, the signal at the junction P1 between the sensor pad 10 and the capacitors may be stably isolated. The amplifier 18 amplifies the signal from the sensor pad 10. Accordingly, since the size of a level shift due to occurrence of a touch input is amplified and output, the touch signal may be obtained stably.

In the embodiment of FIG. 14, a differential amplifier 18a is used as the amplifier 18. The differential amplifier 18a differentially amplifies the signal from the sensor pad 10 according to an inverted or non-inverted differential input voltage Vdif. Here, Vdif may be externally controlled. Vdif may be a signal corresponding to the charging signal applied through the charging unit 12. Preferably, Vdif is the signal corresponding to the voltage level at the junction P1 at the time of non-occurrence of a touch input.

Likewise, if Vdif corresponds to the voltage level at the junction P1 at the time of non-occurrence of a touch input, the differential amplifier 18a amplifies only the value of the level shift, at the time of occurrence of a touch input and outputs the amplified result. Thus, more clean and reliable touch signal may be obtained.

In order to determine Vdif, there is a need to extract the voltage level at the junction P1 at the time of non-occurrence of a touch input. In addition, in order to obtain a touch signal respectively at the rising time and failing time of the common voltage level, Vdif is also determined preferably by separately extracting the voltage level at the junction P1 at the time of non-occurrence of a touch input, respectively at the rising time and falling time of the common voltage level. Vdif may be determined and entered in a step of manufacturing a touch screen panel. In addition, at the time when power is initially turned on, or periodically when a touch input does not occur, the voltage level at the junction P1 may be detected.

Referring to the embodiments of FIGS. 6 to 14 and the waveform diagram shown in FIG. 15, a method of detecting a touch signal by using a level shift, will be described as follows.

Referring to the block diagram illustrating a system configuration of FIG. 8, the drive IC 30 includes a signal transceiver 31, a timing controller 33, a signal processing unit 35, and a memory unit 28. In addition, as being the case, the drive IC 30 may further include a common voltage detector 43 and/or a common voltage receiver 45.

The drive IC 30 is mounted on one side of the substrate 50, in the form of a COG (Chip On Glass) pattern or a COF (Chip On Film) pattern. Of course, the drive IC 30 may be mounted on the substrate 50 in other ways. In addition, in the case that a touch screen panel is built in a display device 200, as shown in FIG. 11, the drive IC 30 may be integrated in a drive IC for display screen of the display device 200.

As shown in FIG. 8, a detecting signal obtained from the drive IC 30 is delivered to a central processing unit (CPU) 40. The CPU 40 may be a CPU of a display device, a main CPU of a computer device, or a CPU of a touch screen panel itself. For example, an 8 bit or 16 bit microprocessor may be built-in or embedded to process a touch signal. Although it is not shown in the drawing, a power supply may be further included in a system configuration in order to generate a high or low voltage of signals for detecting touch inputs.

The microprocessor embedded in the drive IC 30 may calculate touch input coordinates, to thus recognize gestures such as zoom, rotation, and move, and deliver data such as reference coordinates (or central point coordinates) and gestures to the main CPU. In addition, the microprocessor may calculate an area of a touch input to generate a zooming signal, calculate a strength of the touch input, and recognize only a user's desired GUI object (for example, only a GUI object whose area is frequently detected) as a valid input, in the case that a plurality of GUI objects are simultaneously touched, that is, the microprocessor may process data in various forms, and output the processed result.

The timing controller 33 generates a time divisional signal of several tens of milliseconds (ms), and the signal processing unit 35 transmits and receives signals to and from each of the linear driving patterns 20b and each of the linear sensor patterns 10b, through the signal transceiver 31, respectively. The signal transceiver 31 supplies on/off control signals Vgn and charging signals Vbn for the charging unit 12. As a preferred example, the signal transceiver 31 sequentially scans and supplies an alternating voltage level to each of the linear driving patterns 20b. A scan signal supplied to each of the linear driving patterns 20b is represented as SCn. In addition, the signal transceiver 31 receives a detecting signal SENn from each of the linear sensor patterns 10b. The scan signals SCn are of alternating AC waves, and provided as triangular waves, sinusoidal waves or square waves. Preferably, SCn are square waves.

The memory unit 28 solves a problem that capacitors including Cp vary due to position of the sensor pad 10, wiring length, other external factors, etc., and thus a deviation of a level shift occurs in each cell. A method of calibrating a reference signal for detecting a touch input for each cell by using the memory unit 28 will be described later.

In addition, the memory unit 28 is used to temporarily store a signal at the time of occurrence of a touch input. As shown in FIG. 16, the memory unit 28 has unique absolute addresses for each sensor pad 10.

In the illustrated embodiment the sensor pad 10 has been illustrated as an example of a resolution of 3*3, but actually has a higher resolution. As a result, signals may be lost in the process of dealing with many signals. For example, in the case that, the signal processing unit 35 is in a "busy" state, the touch detecting signal is not recognized and may be missed. The memory unit 28 prevents the loss of such a signal.

The signal processing unit 35 detects the touch signal, to then be temporarily stored in the memory unit 28. In addition, the signal processing unit 35 scans the entire active region and then judges whether or not a missing signal exists with reference to the memory unit 28. If touch coordinates are stored in the memory unit 28 although signals have been lost in the signal processing, the signal processing unit 35 processes the corresponding touch coordinates as normal inputs to then erase the memory unit 28 prior to next scanning.

Hereinbelow, several important Equations are referred to as a method of detecting a touch input according to the present, invention. A case where the common electrode 220 of the display device 200 has a DC voltage level as in a dot inversion driving method will be first described and then a case where the common electrode 220 of the display device 200 has AC waveform as in a line inversion driving method will be described later.

Referring to FIG. 6, when a conductor such as the finger 25 approaches the sensor pad 10, a touch capacitance Ct is formed between the sensor pad 10 and the finger 25, and the touch capacitance Ct has a predetermined voltage level due to a charged voltage. Here, since one end of the touch capacitance Ct is connected, with one end of the driving capacitance Cdrv, the electric potential of the sensor pad 10 will vary due to the AC voltage applied to the driving pad 20. In addition, when the finger 25 of the human body approached the driving capacitance Cdrv formed between the sensor pad 10 and the driving pad 20, the size of the driving capacitance Cdrv varies.

If the common electrode 220 of the display device 200 has a DC voltage level and a touch input has not occurred, a voltage variation at the junction P1 is determined by the following Equation 1.

$$\Delta Vsensor = \pm(VdrvH - VdrvL)\frac{Cdrv}{Cdrv + Cvcom + Cp} \quad 1$$

It is assumed that SC1 is in a turn-on state, and both SC2 and SC3 are in turn-off states, and a finger 25 approaches a lower-left sensor pad 10 in FIG. 8. In this case, since the linear driving pattern 20b is turned off at a point where a touch input has occurred, the corresponding touch input should be ignored. Under this assumption, since the touch capacitance Ct is added in parallel to the junction P1, a voltage variation at the junction P1 is determined by the following Equation 2.

$$\Delta Vsensor = \pm(VdrvH - VdrvL)\frac{Cdrv}{Cdrv + Cvcom + Cp + Ct} \quad 2$$

If SC3 is changed into a turn-on state according to lapse of a time, a corresponding touch signal is recognized as a normal touch signal since the touch input has occurred at a point where the linear driving pattern 20b has been turned on. However, in this case, as described with reference to FIG. 6, the driving capacitance Cdrv varies. Under the circumstances of the touch detecting system, Cdrv' may become larger or smaller than Cdrv. In the following illustration, a case where Cdrv' became larger than Cdrv will be described. Under the above assumption, an addition of Ct and a variation Cdrv' of Cdrv act on the voltage variation at the junction P1. The voltage variation at the junction P1 is determined by the following Equation 3.

$$\Delta Vsensor = \pm(VdrvH - VdrvL)\frac{Cdrv'}{Cdrv' + Cvcom + Cp + Ct} \quad 3$$

in Equations 1 to 3, ΔVsensor is a voltage variation in the sensor pad 10, VdrvH is a high level voltage of the AC voltage applied to the driving pad 20, VdrvL is a low level voltage of the AC voltage applied to the driving pad 20, Cdrv is the driving capacitance, Cdrv' is the diving capacitance that has varied due to the occurrence of a touch input, Cvcom is the common electrode capacitance, Cp is a parasitic capacitance, and Ct is a touch capacitance.

The level shift detector 14 detects a level shift in the sensor pad 10 by using Equations 1 to 3, which will be described below in detail.

In Equations 1 to 3, VdrvH and VdrvL, are values that may be easily set up, and high and low voltages of the AC voltage, in addition, Cdrv may be obtained from following Equation 4.

$$Cdrv = \varepsilon\frac{S1}{D1} \quad 4$$

In Equation 4, ∈ is the dielectric constant (or permittivity) of the insulator 15, and may be obtained by multiplying the specific dielectric constant of the material of the insulator 15 by the dielectric constant of vacuum. S1 is an opposite area between the sensor pad 10 and the driving pad 20, which may be obtained from an area of an overlap region 20c of the driving pad 20. In addition, D1 is a distance between the sensor pad 10 and the driving pad 20, and thus corresponds to thickness of the insulator 15. In the previous example, thickness of the insulator 15 is about 100 Å to about 100 μm. As seen, Cdrv is a value that may be easily obtained from a design value. Cvcom may be obtained from following Equation 5.

$$Cvcom = \varepsilon\frac{S2}{D2} \quad 5$$

In Equation 5, ∈ may be obtained from the dielectric constant (or permittivity) of a medium existing between the sensor pad 10 and the common electrode 220. S2 is an opposite area between the sensor pad 10 and the common electrode 220, and may be obtained from a cross-sectional area of the sensor pad 10 since the common electrode 220 is formed in a surface shape. D2 is a distance between the sensor pad 10 and the common electrode 220, and thus corresponds to thickness of the medium existing between the sensor pad 10 and the common electrode 220.

Here, in the embodiments of FIGS. 10 and 11, the media existing between the sensor pad 10 and the common electrode 220 differ from each other. In the case that the substrate 50, the air gap 58 and the color filter 215 exist as shown in FIG. 10 (since a polarization plate, BEF, etc., further exist actually, the dielectric constants of these media should be included), capacitors due to a plurality of media should be considered. In this case, since Cvcom equals the case where capacitors that are formed on each of the opposite surfaces of the dielectric materials are connected in series, Cvcom may be obtained from these capacitors. In the example of FIG. 11, since only the color filter 215 exists between the sensor pad 10 and the common electrode 220, Cvcom may be more easily obtained. The touch capacitance Ct may be obtained from following Equation 6.

$$Ct = \varepsilon \frac{S3}{D3} \qquad 6$$

In Equation 6, $\varepsilon$ may be obtained from the dielectric constant of a medium between the sensor pattern 10 and the finger 25. If a reinforced glass or protection panel 52 is attached on the top surface of the substrate 50, the permittivity $\varepsilon$ may be obtained by multiplying the specific dielectric constant of the reinforced glass by the dielectric constant of vacuum. S3 is an opposite area between the sensor pad 10 and the finger 25. If the finger 25 covers the entire surface of a certain sensor pad 10, S3 corresponds to the area of the certain sensor pad 10 that has been covered with the finger 25. If the finger 25 covers part of a certain sensor pad 10, S3 will be reduced by an area of the certain sensor pad 10 that has not been covered with the finger 25. In addition, D3 is a distance between the sensor pad 10 and the finger 25, and thus corresponds to thickness of the reinforced glass or protection panel 52 that is put on the upper surface of the substrate 50.

As described above, Ct is a value that can be easily obtained, and that can be also easily set up by using the material or thickness of the reinforced glass or protection panel 52 that is put on the upper surface of the substrate 50. In particular, according to the Equation 6, since Ct is proportional to the opposite area between the finger 25 and the sensor pad 10, a touch share of the finger 25 with respect to the sensor pad 10 can be calculated from the Ct.

By using the above-described Equations 1 to 6, the voltage variations at the junction P1 may be detected for each of the cases, that is, (i) at the time of non-occurrence of a touch input, (ii) at the time of occurrence of a touch input in a non-scan line of the linear driving pattern 20b, and (iii) at the time of occurrence of a touch input in a scan line of the linear driving pattern 20b, when the common voltage of the display device 200 has a DC level. Here, a touch signal is actually obtained in the third case, that is, (iii) at the time of occurrence of a touch input in a scan line of the linear driving pattern 20b. The level shift detector 14 detects the level shift at the junction P1, and the drive IC 30 judges whether or not the current case is the case of (iii), to thus acquire a touch signal.

Meanwhile, the common voltage of the display device 200 may be an AC component like the signal applied to the driving pad 20. In this case, a variation of the common voltage influences upon detection of a touch input. The voltage variation at the junction P1 considering the above variation of the common voltage is determined by following Equations 7 to 9. In this embodiment, it is preferable that a common voltage level of the display device 200 is synchronized with an alternating voltage level applied to the driving pad 20.

To do so, the drive IC 30 may include the common voltage detector 43 or the common voltage receiver 45. The common voltage detector 43 automatically detects a common voltage. For example, the common voltage detector 43 is configured in a manner of detecting whether or not the electric potential at the junction P1 is alternated according to alternating of the common voltage, at a state where a supply of a charging signal is blocked in the charging unit 12 and the sensor pad 10 is electrically isolated. The common voltage receiver 45 directly receives common voltage information from the display device 200. If the alternating voltage level applied to the driving pad 20 is synchronized in-phase or anti-phase by using the above-described the common voltage detector 43 or the common voltage receiver 45, a touch detection operation may be easily performed although the common electrode 220 of the display device 200 has an alternating voltage level.

The Equations 7 to 9 that are explained in this embodiment cite the previously described Equations 4 to 6, in order to obtain values of capacitors.

If the common electrode 220 of the display device 200 alternates, and a touch input has not occurred, a voltage variation at the junction P1 is determined by the following Equation 7, $$\Delta Vsensor = \pm (VdrvH - VdrvL)\frac{Cdrv + Cvcom}{Cdrv + Cvcom + Cp} \qquad 7$$

It is assumed that SC1 is in a turn-on state, and both SC2 and SC3 are in turn-off states, and a finger 25 approaches a lower-left sensor pad 10 in FIG. 8. In this case, since the linear driving pattern 20b is turned off at a point where a touch input has occurred, the corresponding touch input should be ignored. Under this assumption, since the touch capacitance Ct is added in parallel to the junction P1, a voltage variation at the junction P1 is determined by the following Equation 8.

$$\Delta Vsensor = \pm (VdrvH - VdrvL)\frac{Cdrv + Cvcom}{Cdrv + Cvcom + Cp + Ct} \qquad 8$$

If SC3 is changed into a turn-on state according to lapse of a time, a corresponding touch signal is recognized as a normal touch signal since the touch input has occurred at a point where the linear driving pattern 20b has been turned on. However, in this case, as described with reference to FIG. 6, the driving capacitance Cdrv varies into Cdrv'. Under the above assumption, an addition of Ct and a variation Cdrv' of Cdrv act on the voltage variation at the junction P1. The voltage variation at the junction P1 is determined by the following Equation 9.

$$\Delta Vsensor = \pm (VdrvH - VdrvL)\frac{Cdrv' + Cvcom}{Cdrv' + Cvcom + Cp + Ct} \qquad 9$$

In Equations 7 to 9, $\Delta$Vsensor is a voltage variation in the sensor pad 10, VdrvH is a high level voltage of the AC voltage applied to the driving pad 20, VdrvL is a low level voltage of the AC voltage applied to the driving pad 20. Cdrv is the driving capacitance, Cdrv' is the driving capacitance that has varied due to the occurrence of a touch input, Cvcom is the common electrode capacitance, Cp is a parasitic capacitance, and Ct is a touch capacitance.

The level shift detector 14 detects a level shift in the sensor pad 10 by using Equations 7 to 9, when the common voltage of the display device 200 alternates.

FIG. 15 is a waveform diagram illustrating a process of detecting a touch signal according to the present invention, and shows an example of detecting a touch signal when a 3-terminal switching unit such as MOS or FET is used as the charging unit 12 and a differential amplifier 18a is used as the level shift detector 14, as shown in FIG. 14. In the illustration of FIG. 15, the common voltage of the display device 200 is a DC level, and the above Equations 1 to 6 are referenced.

In FIG. 15, the turn-on voltage of the gate voltage Vg of the charging unit 12 is 3V and the turn-off voltage thereof is 0V. The charging signal Vb is applied as 5V, and may vary with the gate voltage Vg and may be maintained to be always in a high state. The AC voltage Vdrv of the driving pad 20 is given as about 3V at the high level and about 0V at the low level. The larger the difference in the height of the AC voltage is, the better it is. However, since the differential amplifier 18a is used in the present embodiment, the level shift may be easily detected even through the difference in the height of the AC voltage is small. Detecting is performed after the charging operation as shown in the lower portion of the waveform diagram of FIG. 15. In addition, it has been assumed that Cdrv and Ct equal, and Cvcom=10Ct, Cdrv'=1.5Cdrv, and Cp is negligible in value. The reason why it has been assumed that the size of Cvcom is large is because Cvcom acts on the entire linear sensor patterns 10b since a plurality of sensor pads 10 form the linear sensor patterns 10b.

When charging 1 is performed, the electric potential V_P1 at the junction P1 is maintained as 5V that is the charging voltage. After charging 1 has been, performed, detecting 1 is performed at the rising time of Vdrv. Detecting 1 occurs immediately after the rising time of Vdrv or after a predetermined period of time has elapsed. Here, since a touch input does not occur, the value of ΔVsensor in the Equation 1 is "(3−0)*1/11," that is, about 0.27V. Thus, the electric potential V_P1 rises up to about 5.27V. Vdif is also given as about 5.27V at the time of non-occurrence of a touch input. Since the voltage level of V_P1 and Vdif are ideally same at the time of non-occurrence of a touch input, the output Vt of the differential amplifier 18a does not nearly occur, if there is an influence due to noise, etc., Vt is output as a very weak signal.

As shown in FIG. 15, it is assumed that a touch input has occurred immediately before charging 2 is performed (or charging 2 is being performed), and a point where a touch input has occurred is on a non-scan line of the linear driving pattern 20b.

When charging 2 has been performed, the voltage level at the junction P1 falls back down to about 5V that is the charging voltage. In addition, since a touch input has occurred at the falling time of Vdrv and in the non-scan line, when detecting 2 is performed, V_P1 varies by "−(3−0)*1/12" according to Equation 2. That is, V_P1 varies by about 0.25V. That is, it can be seen from detecting 2 that V_P1 is 4.75V and a level shift of 0.02V has occurred, in anti-phase with respect, to the variation of Vdrv, in comparison with non-occurrence of a touch input.

In this case, Vdif of the differential amplifier 18a corresponds to the value of V_P1 at the time of non-occurrence of a touch input, and thus varies by "−(3−0)*1/12" according to Equation 1 to have a value of 4.73V. Thus, the output Vt of the differential amplifier 18a amplifies 0.02V that is the difference between two inputs V_P1 and Vdif and outputs the amplified result. However, since it is difficult to find an accurate point of a touch signal on a non-scan line, the corresponding level shift is ignored or may be used as only reference data for determining other touch points.

As shown, it is assumed that a scanning operation has proceeded for the linear driving patterns 20b after detecting 2 has been preformed, and thus a touch input has occurred on a scan line. Once charging 3 is performed after detecting 2 has been performed, V_P1 will return to 5V according to the charging voltage. In addition, since a touch input has occurred at the rising time of Vdrv in the process of detecting 3, and on a scan line, V_P1 varies by "(3−0)*1.5/12.5" according to Equation 3. That is, V_P1 varies by 0.36V.

Accordingly, V_P1 is 5.36V, and thus a level shift of 0.09V has occurred in the same phase as the variation of Vdrv, in comparison with non-occurrence of a touch input. When compared with the level shift by a touch input on a non-scan line, it can be seen that the phase of the level shift has been reversed and the size thereof has become larger. Thus, it is easy to detect a touch signal on a scan line by distinguishing a touch input on a non-scan line from a touch input on a scan line. In addition, as can be seen from the waveform of Vt, the difference of 0.09V is differentially amplified, to thus acquire a touch signal more reliably.

If charging 4 is performed after detecting 3 has been preformed, V_P1 will return to 5V according to the charging voltage. Thereafter, since a touch input has occurred at the failing time of Vdrv in the process of detecting 4, and on a scan line, V_P1 varies by "−(3−0)*1.5/12.5" according to Equation 3. That is, V_P1 varies by −0.36V. Accordingly, V_P1 is 4.64V, and thus a level shift of −0.09V has occurred in the same phase as the variation of Vdrv.

To summarize the above description, V_P1 and Vdif are ideally same, at the time of non-occurrence of a touch input. Thus, Vt is output as only a weak signal which corresponds to noise. If a touch input occurs with respect to a certain sensor pad 10, in a non-scan region of the driving voltage, V_P1 is level-shifted in a reverse direction to a variation of the driving voltage in comparison with Vdif. The size of the level shift, is relatively small. If a touch input occurs with respect to a certain sensor pad 10, in a scan region of the driving voltage, V_P1 is level-shifted in the same direction as a variation of the driving voltage in comparison with Vdif. The size of the level shift is relatively large. That is, it can be seen that a level shift of a touch input on a non-scan line of the driving voltage proceeds in a reverse direction to that on a scan line thereof, and a difference between the level shifts of the touch inputs on the non-scan line and the scan line of the driving voltage is large (on the basis of the size of the level shift on the non-scan line). In addition, the difference between the level shifts of the touch inputs on the non-scan line and the scan line will be widened further by the differential amplifier 18a. Accordingly, it can be seen that, the touch input that occurs on the scan region of the driving voltage may be detected easily and stably, and a multi-touch input may be recognized. Meanwhile, since a touch share of the finger 25 may be also easily calculated in the above manner, a touch resolution may be heightened in comparison with the physical resolution of the sensor pad 10.

In the above description, it has been assumed that Cp in Equations 1 to 3 is a small value negligible compared to Cdrv. In some environments, however, the parasitic capacitance Cp may act greatly and may differ for each sensor pad 10. For example, it is very difficult to uniformly design position of the sensor pad 10, wiring length, other external factors, etc., for each sensor pad 10. In addition, Cdrv may also differ for each sensor pad 10. If the size of the level shift is great, such deviations may be ignored, but as the size of the level shift is smaller, such a deviation for each sensor pad 10 becomes a value that cannot, be negligible.

In order to solve these problems, the drive IC 30 uses the memory unit 28 as briefly described above. The memory unit 28 stores the output signal of the differential amplifier 18a for each sensor pad 10 when a touch input does not occur. The output signal output, from the differential amplifier 18a and stored in the memory unit 28 is a value based on a unique Cp of each sensor pad 10, and may vary for each sensor pad 10.

For example, if the sensor pads 10 are scanned immediately after power is applied to the sensor pads 10, the output of the differential amplifier 18a may be obtained at a state where a touch input, does not occur. If a deviation in the output, of the differential amplifier 18a is large for each sensor pad 10, the output of the differential amplifier 18a is ignored. Then, again the output of differential amplifier 18a at the time of non-occurrence of a touch input may be extracted. Or the output of the differential amplifier 18a at the time of non-occurrence of a touch input may be stored in the memory unit 28 for each sensor pad 10, at a step of shipping the differential amplifier 18a from a manufacturer. In addition, the drive IC 30 may compare a value in an identical cell with a previous value therein, and may judge that a touch input has occurred when the value in the identical cell varies by a preset reference value or higher.

Referring to FIG. 16, when the sensor pads 10 are arranged to have a resolution of m*n, the memory unit 28 consists of a table with m columns and n rows. For example, the output of differential amplifier 18a that has occurred at the time of non-occurrence of a touch input and that has been assigned at the uppermost-leftmost corner of the sensor pads 10 may be stored in an address of M1-1. In addition, the signal stored in the memory unit 28 is referenced when it is detected whether or not a touch input occurs at the uppermost-leftmost, corner of the sensor pads 10.

The value stored in each address of the memory unit 28 may be periodically calibrated. The periodic calibration may be carried out when power is applied to the device, as described above, or in a dormant state. As described above, if the output of differential amplifier 18a is stored in the memory unit 28, at the time of non-occurrence of a touch input for each sensor pad 10 (or respectively separately at the time of non-occurrence and occurrence of a touch input), periodically calibrated, and referenced at the time of detecting a touch signal, the touch signal may be stably acquired even in the case that a unique Cp is assigned for each sensor pad 10.

As described above, the invention has been described with respect to the preferred embodiments. However, the invention is not limited to the above embodiments, and it is possible for one who has an ordinary skill in the art to make various substitutions, modifications and variations without departing off the spirit of the invention defined by the claims.

INDUSTRIAL APPLICABILITY

The present invention provides a capacitive touch detecting device, a capacitive touch detecting method, and a touch screen panel, using a level shift, and a display device having a built-in touch screen panel, which may be applied to input devices which are respectively attached onto display devices such as LCDs (Liquid Crystal Displays), PDPs (Plasma Display Panels), OLED (Organic Light Emitting Diode) displays, and AMOLED (Active Matrix Organic Light Emitting Diode) displays.

The invention claimed is:

1. A capacitive touch detecting device for detecting occurrence of a touch capacitance (Ct) by an approach of a bodily finger (25) or a touch input instrument such as a conductor similar to the bodily finger, the capacitive touch detecting device comprising:
    a sensor pad (10) that forms the touch capacitance (Ct) between the touch input instrument and the sensor pad (10), and forms a common electrode capacitance (Cvcom) between a common electrode (220) of a display device (200) and the sensor pad (10);
    a driving pad (20) that is spaced away from the sensor pad (10) by the medium of an insulator (15), forms a driving capacitance (Cdrv) between the sensor pad (10) and the driving pad (20), and has an alternating voltage level alternating at a predetermined frequency;
    a charging unit (12) that supplies a charge signal to the sensor pad (10) to thus accumulate charges in the touch capacitance (Ct), the common electrode capacitance (Cvcom), and the driving capacitance (Cdrv); and
    a level shift detecting unit (14) that is connected to the sensor pad (10), and that detects whether or not a level shift occurs in a voltage variation of the sensor pad (10) due to the alternating voltage level of the driving pad (20) when the touch capacitance (Ct) is added to the common electrode capacitance (Cvcom), at the time of occurrence of a touch input, with respect to another voltage variation of the sensor pad (10) due to the alternating voltage level of the driving pad (20), at the time of non-occurrence of a touch input, to thereby acquire a touch signal.

2. The capacitive touch detecting device according to claim 1, wherein a plurality of the sensor pads (10) are respectively connected with connectors (10a), to thus form linear sensor patterns (10b), and a plurality of driving pads (20) are respectively connected with connectors (20a), to thus form linear driving patterns (20b), in which part of the driving pad (20) overlaps part of the sensor pad (10).

3. The capacitive touch detecting device according to claim 2, wherein the insulator (15) is about 100 Å to about 100 µm thick.

4. The capacitive touch detecting device according to claim 2, wherein an alternating voltage level is sequentially scanned and supplied to each of the linear driving patterns (20b).

5. The capacitive touch detecting device according to claim 1, wherein the level shift detecting unit (14) detects whether or not a level shift occurs in a voltage variation of the sensor pad (10) when the touch capacitance (Ct) is added to the common electrode capacitance (Cvcom), and the driving capacitance (Cdrv) varies, with respect to another voltage variation of the sensor pad (10) due to the driving capacitance (Cdrv), at the time of non-occurrence of a touch input.

6. The capacitive touch detecting device according to claim 1, wherein the common electrode (220) of the display device (200) has a direct-current (DC) voltage level.

7. The capacitive touch detecting device according to claim 6, wherein the voltage variation of the sensor pad (10) due to the driving capacitance (Cdrv), at the time of non-occurrence of a touch input is determined by following Equation 1,
    wherein the voltage variation of the sensor pad (10) when the touch capacitance (Ct) is added to the common electrode capacitance (Cvcom), and the driving capacitance (Cdrv) varies, is determined by following Equation 3, and
    wherein the level shift occurs due to a difference between the voltage variations of the following Equations 1 and 3, $$\Delta Vsensor = \pm(VdrvH - VdrvL)\frac{Cdrv}{Cdrv + Cvcom + Cp} \qquad 1$$

$$\Delta Vsensor = \pm(VdrvH - VdrvL)\frac{Cdrv'}{Cdrv' + Cvcom + Cp + Ct}, \qquad 3$$

in which ΔVsensor is a voltage variation in the sensor pad, VdrvH is a high level voltage of the AC voltage applied to the driving pad, VdrvL is a low level voltage of the AC voltage applied to the driving pad, Cdrv is the driving capacitance, Cdrv' is the driving capacitance that has varied due to the occurrence of a touch input, Cvcom is the common electrode capacitance, Cp is a parasitic capacitance, and Ct is a touch capacitance.

8. The capacitive touch detecting device according to claim 1, wherein the common electrode (220) of the display device (200) has a common voltage level alternating at a predetermined frequency.

9. The capacitive touch detecting device according to claim 8, wherein the alternating voltage level of the driving pad (20) is synchronized in-phase or anti-phase with the alternating voltage level of the common electrode (220).

10. The capacitive touch detecting device according to claim 8, wherein the voltage variation of the sensor pad (10) due to the driving capacitance (Cdrv), at the time of non-occurrence of a touch input is determined by following Equation 7,
wherein the voltage variation of the sensor pad (10) when the touch capacitance (Ct) is added to the common electrode capacitance (Cvcom), and the driving capacitance (Cdrv) varies, is determined by following Equation 9, and
wherein the level shift occurs due to a difference between the voltage variations of the following Equations 7 and 9, $$\Delta Vsensor = \pm(VdrvH - VdrvL)\frac{Cdrv + Cvcom}{Cdrv + Cvcom + Cp} \qquad 7$$

$$\Delta Vsensor = \pm(VdrvH - VdrvL)\frac{Cdrv' + Cvcom}{Cdrv' + Cvcom + Cp + Ct}, \qquad 9$$

in which ΔVsensor is a voltage variation in the sensor pad, VdrvH is a high level voltage of the AC voltage applied to the driving pad, VdrvL is a low level voltage of the AC voltage applied to the driving pad, Cdrv is the driving capacitance, Cdrv' is the driving capacitance that has varied due to the occurrence of a touch input, Cvcom is the common electrode capacitance, Cp is a parasitic capacitance, and Ct is a touch capacitance.

11. The capacitive touch detecting device according to claim 1, wherein the level shift detecting unit (14) detects the level shift in the sensor pad (10) at the rising time and/or falling time of the AC voltage level of the driving pad (20).

12. The capacitive touch detecting device according to claim 1, wherein the level shift detecting unit (14) detects a touch share of the touch input instrument with respect to the sensor pad (10) in correspondence to size of the level shift.

13. The capacitive touch detecting device according to claim 1, wherein the level shift detecting unit (14) comprises a signal detecting switching unit (16) whose on/off control terminal is connected to the sensor pad (10).

14. The capacitive touch detecting device according to claim 1, wherein the level shift detecting unit (14) comprises an amplifier (18) to amplify the signal from the sensor pad (10).

15. The capacitive touch detecting device according to claim 14, wherein the amplifier (18) is a differential amplifier (18a) to differentially amplify the signal from the sensor pad (10).

16. The capacitive touch detecting device according to claim 15, wherein a differential input signal of the differential amplifier (18a) is a signal corresponding to the voltage variation of the sensor pad (10) due to the driving capacitance (Cdrv) at the time of non-occurrence of a touch input.

17. The capacitive touch detecting device according to claim 14, further comprising a memory unit (28) that stores the output from the amplifier (18) for the sensor pad (10), to thus detect whether or not a touch input occurs for the sensor pad (10), with reference to the memory unit (28).

18. A capacitive touch detecting method for detecting occurrence of a touch capacitance (Ct) by an approach of a bodily finger (25) or a touch input instrument such as a conductor similar to the bodily finger, the capacitive touch detecting method comprising the steps of:
(a) supplying a charging signal to a sensor pad (10) that forms a driving capacitance (Cdrv) between the sensor pad (10) and a driving pad (20) to which an alternating-current (AC) voltage alternating at a predetermined frequency, forms a common electrode capacitance (Cvcom) between a common electrode (220) of a display device (200) and the sensor pad (10), and forms the touch capacitance (Ct) between the touch input instrument and the sensor pad (10), to thus accumulate charges in the driving capacitance (Cdrv), the common electrode capacitance (Cvcom), and the touch capacitance (Ct);
(b) detecting a voltage variation in the sensor pad (10); and
(c) detecting whether or not a level shift occurs in a voltage variation of the sensor pad (10) clue to the alternating voltage level of the driving pad (20) when the touch capacitance (Ct) is added to the common electrode capacitance (Cvcom), at the time of occurrence of a touch input, with respect to another voltage variation of the sensor pad (10) due to the alternating voltage level of the driving pad (20), at the time of non-occurrence of a touch input, to thereby acquire a touch signal.

19. The capacitive touch detecting method of claim 18, wherein a plurality of the sensor pads (10) are respectively connected with connectors (10a), to thus form linear sensor patterns (10b), and a plurality of driving pads (20) are respectively connected with connectors (20a), to thus form linear driving patterns (20b), in which part of the driving pad (20) overlaps part of the sensor pad (10).

20. The capacitive touch detecting method of claim 19, wherein an alternating voltage level is sequentially scanned and supplied to each of the linear driving patterns (20b).

\* \* \* \* \*